United States Patent
Yukimasa et al.

(10) Patent No.: US 10,560,157 B2
(45) Date of Patent: *Feb. 11, 2020

(54) WIRELESS COMMUNICATION SYSTEM

(71) Applicant: CANON KABUSHIKI KAISHA, Tokyo (JP)

(72) Inventors: Koji Yukimasa, Yokohama (JP); Tadashi Eguchi, Tokyo (JP); Hitoshi Asai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/400,907

(22) Filed: May 1, 2019

(65) Prior Publication Data

US 2019/0260423 A1 Aug. 22, 2019

Related U.S. Application Data

(63) Continuation of application No. 15/865,112, filed on Jan. 8, 2018, now Pat. No. 10,326,499.

(30) Foreign Application Priority Data

Jan. 11, 2017 (JP) .................................. 2017-002712
Nov. 24, 2017 (JP) .................................. 2017-225480

(51) Int. Cl.
*H04B 5/00* (2006.01)
*H01Q 1/48* (2006.01)
(Continued)

(52) U.S. Cl.
CPC ............. *H04B 5/0075* (2013.01); *H01Q 1/48* (2013.01); *H04B 5/0031* (2013.01);
(Continued)

(58) Field of Classification Search
CPC .. H04B 5/0075; H04B 5/0031; H04B 7/0865; H04B 5/0087; H04B 5/0037;
(Continued)

(56) References Cited

U.S. PATENT DOCUMENTS 6,476,520 B1 * 11/2002 Bohm ..................... H01F 38/14
307/104
6,705,898 B2 * 3/2004 Pechstein ............. G01N 27/286
439/660

(Continued)

FOREIGN PATENT DOCUMENTS

EP 2945231 A1 * 11/2015 ......... H01R 13/6658
EP 3168953 A1 * 5/2017 ............. H02J 50/80

*Primary Examiner* — Pablo N Tran

(74) *Attorney, Agent, or Firm* — Canon U.S.A., Inc. IP Division

(57) ABSTRACT

A wireless communication system includes a first communication apparatus including a first antenna and a second antenna, a second communication apparatus including a third antenna and a fourth antenna, a first communication control unit that controls wireless communication based on electric field coupling or magnetic field coupling between the first antenna and the third antenna, and a second communication control unit that controls wireless communication based on electric field coupling or magnetic field coupling between the second antenna and the fourth antenna.

25 Claims, 21 Drawing Sheets

(51) Int. Cl.
*H04L 25/08* (2006.01)
*H04B 7/08* (2006.01)

(52) U.S. Cl.
CPC ......... *H04B 7/0865* (2013.01); *H04L 25/085* (2013.01); *H04B 5/0012* (2013.01)

(58) Field of Classification Search
CPC .......... H04B 5/0012; H01Q 1/48; H01Q 7/04; H01Q 1/2291; H04L 25/085; H01R 2201/02; H01R 13/6658; H01R 13/6691; H02J 50/10; H01F 38/14
See application file for complete search history.

(56) References Cited

U.S. PATENT DOCUMENTS

| | | | | |
|---|---|---|---|---|
| 6,942,520 | B2* | 9/2005 | Barlian | H01R 13/6277 |
| | | | | 439/352 |
| 7,785,151 | B2* | 8/2010 | Feucht | H04L 1/24 |
| | | | | 336/90 |
| 9,040,947 | B2* | 5/2015 | Trewin | H02J 5/005 |
| | | | | 250/551 |
| 9,634,439 | B2* | 4/2017 | Riezebos | H04B 5/0031 |
| 9,707,807 | B2* | 7/2017 | Summers | B60C 23/0427 |
| 9,715,963 | B2* | 7/2017 | Gruenberg | H01F 38/14 |
| 9,728,905 | B2* | 8/2017 | Kondo | H01R 13/6658 |
| 9,762,290 | B2* | 9/2017 | Pilz | H04B 5/0031 |
| 9,825,673 | B2* | 11/2017 | Riezebos | H01F 38/14 |
| 2008/0238688 | A1* | 10/2008 | Rofougaran | H04B 5/0012 |
| | | | | 340/572.7 |
| 2009/0102724 | A1* | 4/2009 | Tsutsumi | H01Q 1/2258 |
| | | | | 343/700 MS |

\* cited by examiner

FIRST TRANSMISSION SIGNAL

FIRST RECEPTION SIGNAL

FIRST CONVERSION-COMPLETED SIGNAL

SECOND TRANSMISSION SIGNAL

SECOND RECEPTION SIGNAL

SECOND CONVERSION-COMPLETED SIGNAL

FIRST TRANSMISSION SIGNAL

FIRST RECEPTION SIGNAL

FIRST CONVERSION-COMPLETED SIGNAL

SECOND TRANSMISSION SIGNAL

SECOND RECEPTION SIGNAL

SECOND CONVERSION-COMPLETED SIGNAL

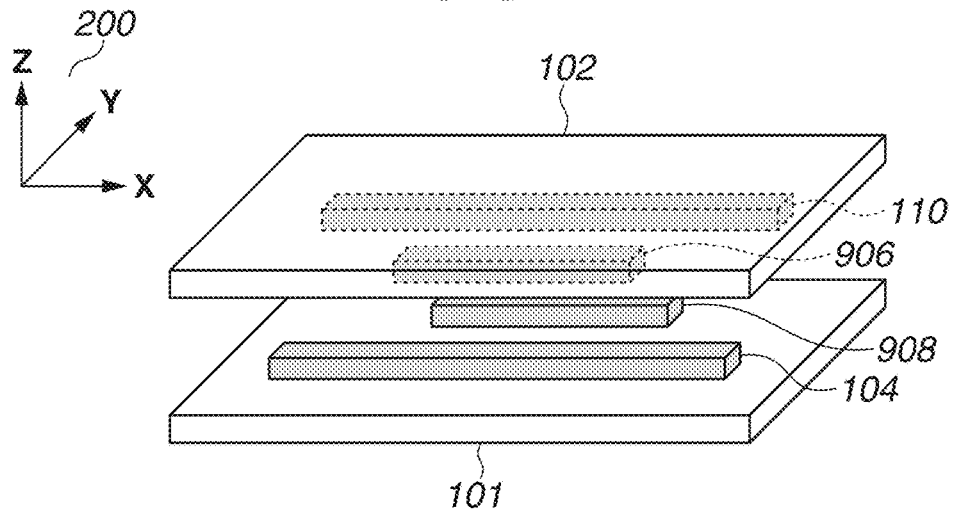
FIG.9A
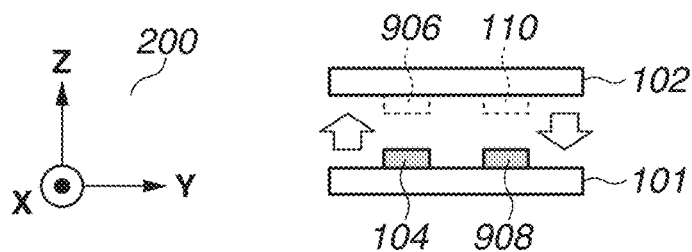
FIG.9B
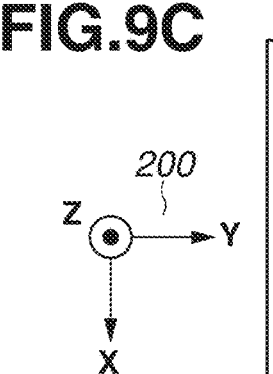
FIG.9C
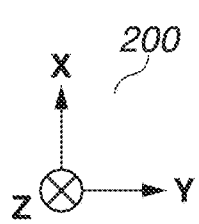
FIG.9D
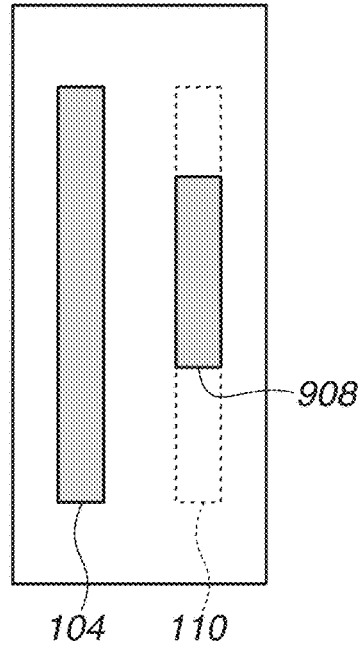

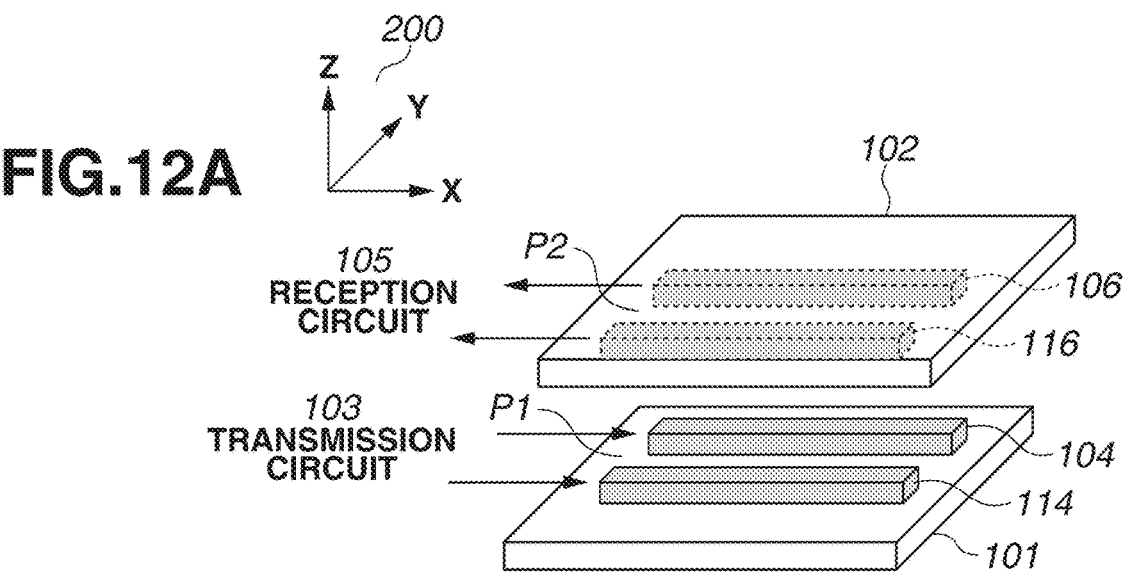
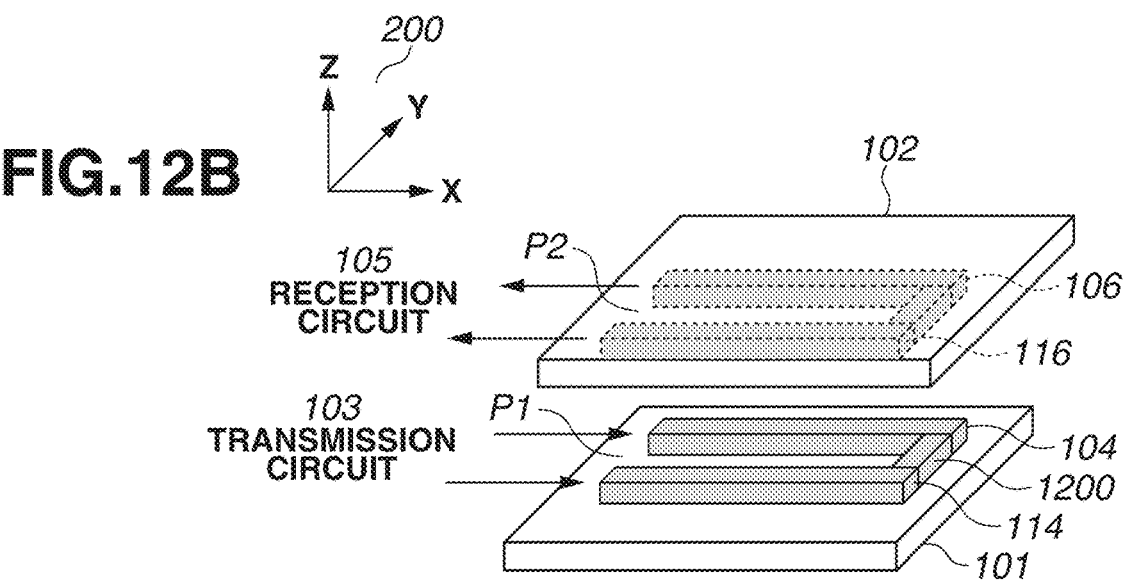
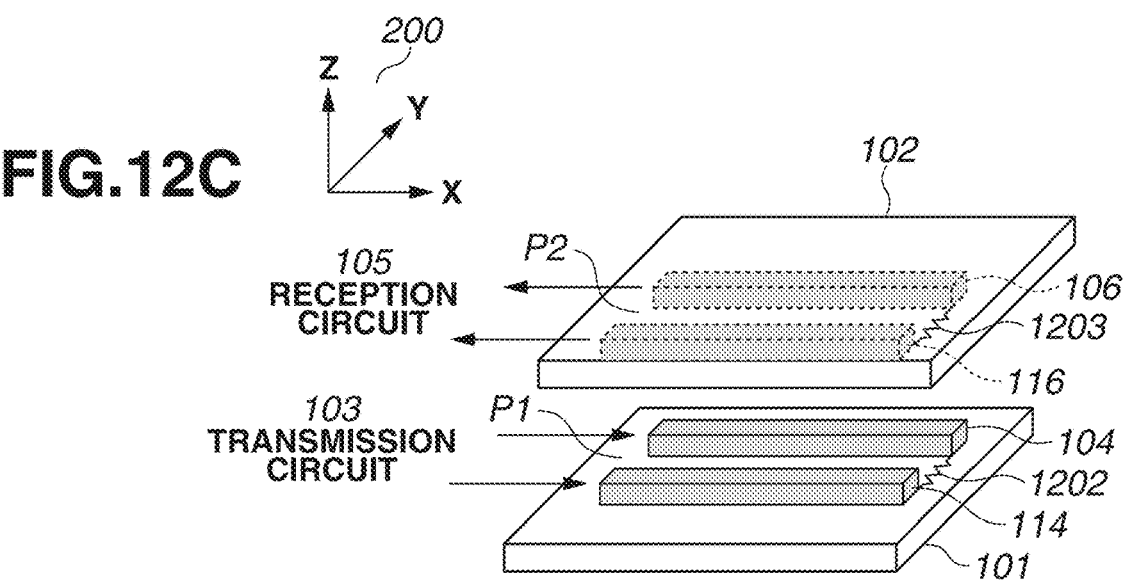

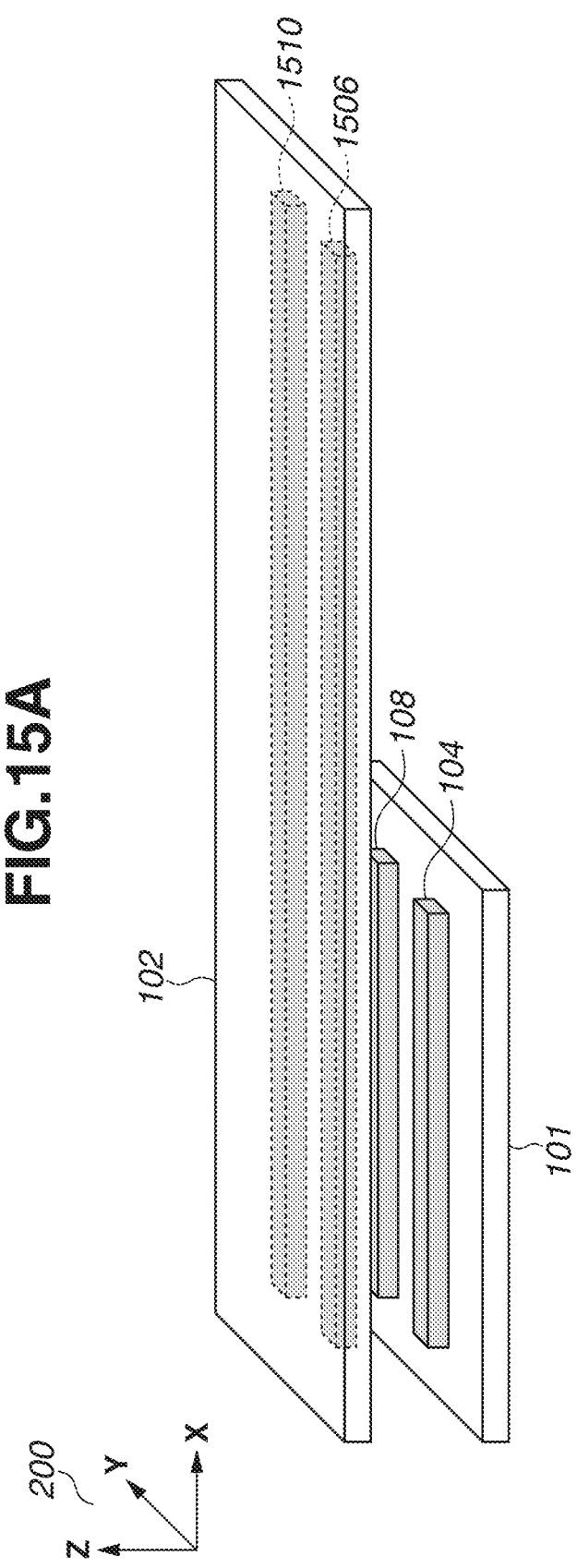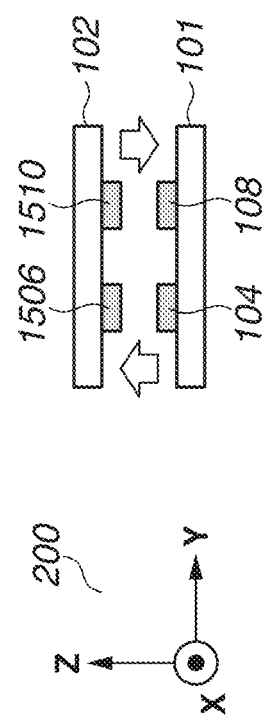

FIG.16A
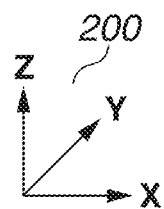
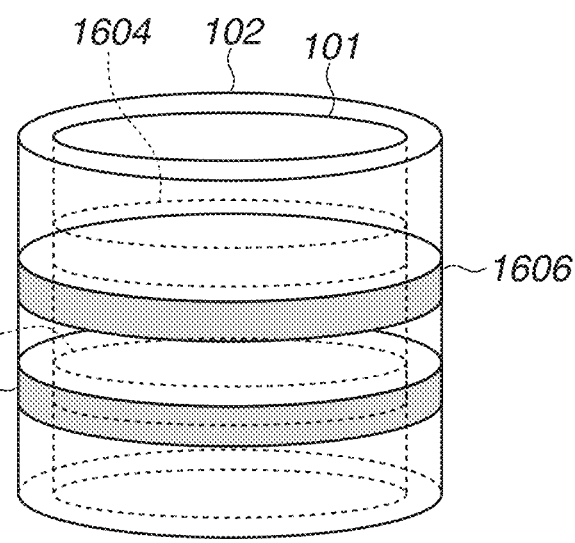
FIG.16B
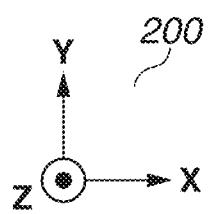
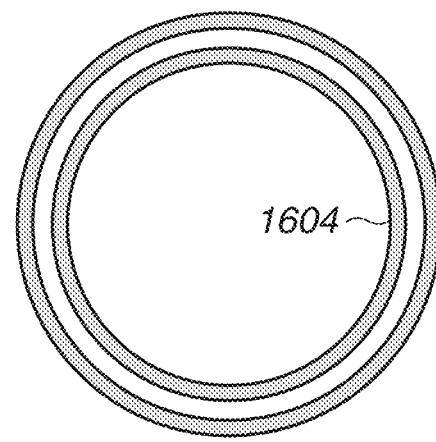
FIG.16C
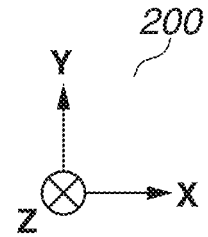
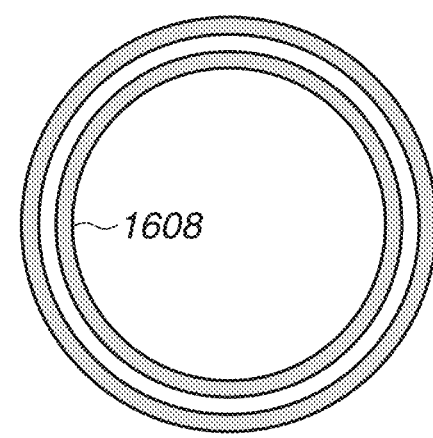

WIRELESS COMMUNICATION SYSTEM

CROSS REFERENCE TO RELATED APPLICATIONS

The present application is a continuation of U.S. patent application Ser. No. 15/865,112, filed on Jan. 8, 2018, which claims priority from Japanese Patent Application No. 2017-002712, filed Jan. 11, 2017, and No. 2017-225480, filed Nov. 24, 2017, which is hereby incorporated by reference herein in its entirety.

BACKGROUND

Field of the Invention

The present disclosure relates to a wireless communication system.

Description of the Related Art

In recent years, there has been proposed a near-field wireless communication system carrying out communication based on electromagnetic field coupling between a pair of antennas placed in proximity to each other. Japanese Patent Application Laid-Open No. 2009-268022 discusses a method for transmitting an electric signal without modulating it based on the baseband method in the wireless communication based on the electromagnetic field coupling, thereby realizing high-speed and low-delay communication with a simple circuit configuration.

However, in recent years, a data amount to be communicated has been increasing, and realization of further high-speed communication in the wireless communication system has been demanded.

SUMMARY

According to an aspect of the present disclosure, a wireless communication system includes a first communication apparatus including a first antenna and a second antenna, a second communication apparatus including a third antenna and a fourth antenna, a first communication control unit configured to control wireless communication based on electric field coupling or magnetic field coupling between the first antenna and the third antenna, and a second communication control unit configured to control wireless communication based on electric field coupling or magnetic field coupling between the second antenna and the fourth antenna. The first antenna, the second antenna, the third antenna, and the fourth antenna are positioned such that an electric signal transmitted from the first antenna and received by the second antenna is weaker in strength than a strength of an electric signal transmitted from the first antenna and received by the third antenna.

Further features will become apparent from the following description of exemplary embodiments with reference to the attached drawings.

BRIEF DESCRIPTION OF THE DRAWINGS

FIGS. 9A, 9B, 9C, and 9D illustrate a configuration example of the wireless communication system 100 for preventing or reducing the interference of the electric signals.

FIGS. 12A, 12B, and 12C illustrate examples of structures of the couplers.

FIGS. 15A and 15B illustrate another configuration example of the wireless communication system 100 including the parallelly movable couplers.

FIGS. 16A, 16B, and 16C illustrate another configuration example of the wireless communication system 100 including the rotatably movable couplers.

DESCRIPTION OF THE EMBODIMENTS

<System Configuration>

Figure 1:
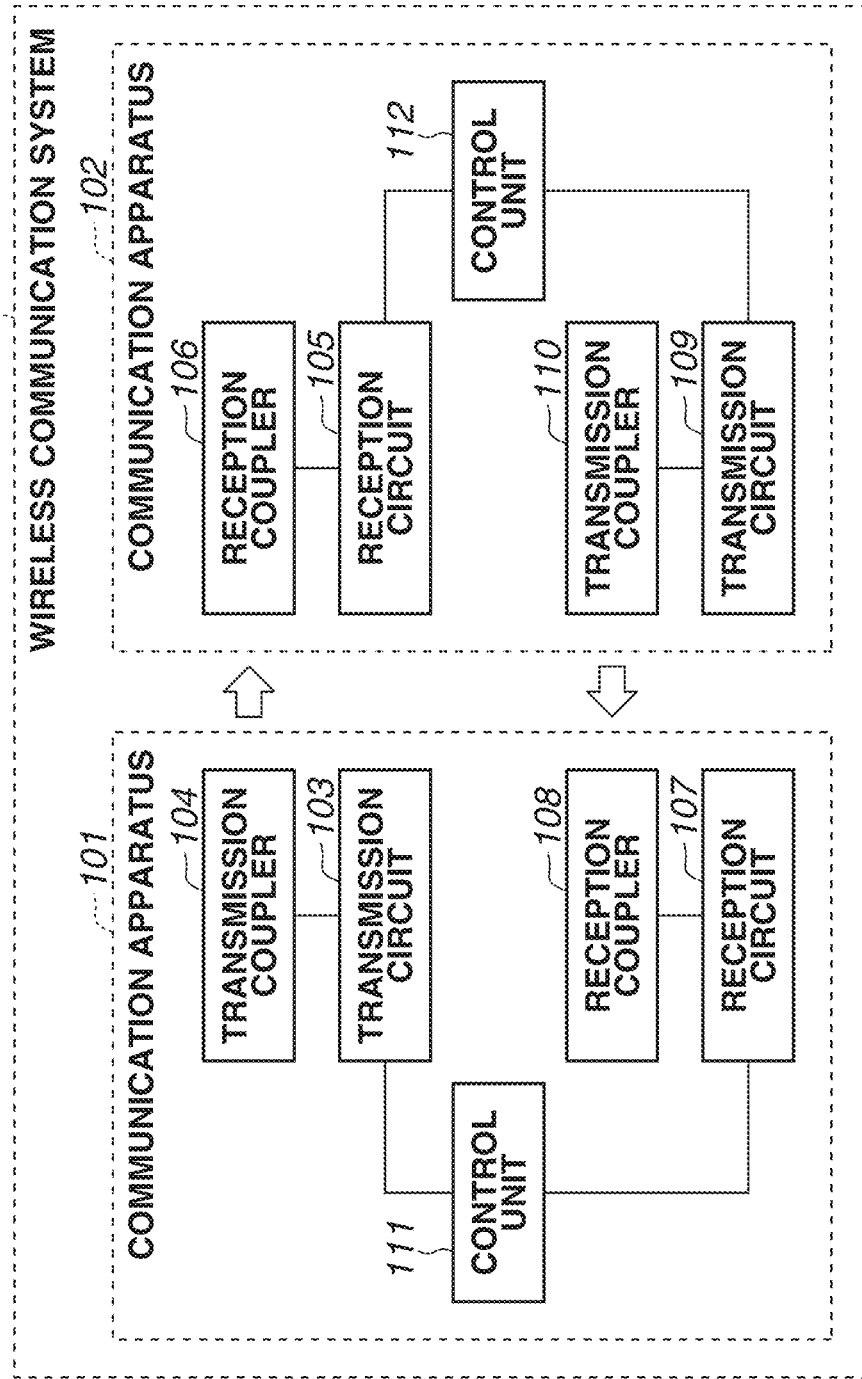
FIG. 1 is a block diagram illustrating a system configuration of a wireless communication system 100.

In the following description, an exemplary embodiment will be described with reference to the drawings. FIG. 1 illustrates a system configuration of a wireless communication system 100 (hereinafter referred to as a system 100) according to the present exemplary embodiment. The system 100 includes a communication apparatus 101, and a communication apparatus 102 that carries out wireless communication with the communication apparatus 101. The communication apparatus 101 includes a transmission circuit 103, a transmission coupler 104, a reception circuit 107, a reception coupler 108, and a control unit 111. Similarly, the communication apparatus 102 includes a reception circuit 105, a reception coupler 106, a transmission circuit 109, a transmission coupler 110, and a control unit 112. The communication apparatus 101 and the communication apparatus 102 can be a first portion and a second portion of a single apparatus.

In the present exemplary embodiment, the system 100 includes a structure for supporting the communication apparatus 101 and the communication apparatus 102 to maintain a predetermined positional relationship therebetween (e.g., such a positional relationship that a distance between the couplers is kept substantially constant). More specifically, the communication apparatus 101 is a pan head portion of a network camera and the communication apparatus 102 is an imaging portion of the network camera. In another example, the communication apparatus 101 is a hand portion of a robot arm and the communication apparatus 102 is an arm portion coupled with the hand portion. In yet another example, the communication apparatus 101 is a print head portion of a printer and the communication apparatus 102 is a main body portion of the printer. How the system 100 is applied is not limited to these examples.

The transmission coupler 104, the transmission coupler 110, the reception coupler 106, and the reception coupler 108 are each a plate-like conductor functioning as an antenna. However, the shapes of the couplers are not limited thereto. The transmission coupler 104 functions as an antenna for carrying out wireless communication based on electromagnetic field coupling with the reception coupler 106, and the transmission coupler 110 functions as an antenna for carrying out wireless communication based on electromagnetic field coupling with the reception coupler 108.

The electromagnetic field coupling according to the present exemplary embodiment includes both electric field coupling and magnetic field coupling. In other words, the wireless communication between the couplers can be carried out based on the electric field coupling, can be carried out based on the magnetic field coupling, or can be carried out based on both the electric field coupling and the magnetic field coupling. In FIG. 1, the communication apparatus 101 and the communication apparatus 102 each include the two couplers for transmission and reception, but at least one or more of the communication apparatus 101 and the communication apparatus 102 can include three or more couplers.

The control unit 111 of the communication apparatus 101 controls the transmission circuit 103 to perform processing for transmitting data to the communication apparatus 102, and controls the reception circuit 107 to perform processing for receiving data from the communication apparatus 102. Similarly, the control unit 112 of the communication apparatus 102 controls the transmission circuit 109 to perform processing for transmitting the data to the communication apparatus 101, and controls the reception circuit 105 to perform processing for receiving the data from the communication apparatus 101. The control unit 111 can control a functional unit (not illustrated) included in the communication apparatus 101 based on the data that the communication apparatus 101 receives by controlling the reception circuit 107. Similarly, the control unit 112 can control a functional unit (not illustrated) included in the communication apparatus 102 based on the data that the communication apparatus 102 receives by controlling the reception circuit 105. Here, examples of the functional unit include a display control unit that causes an image based on the received data to be displayed on a display unit, and a transfer unit that transfers the received data to an external apparatus.

The transmission circuit 103 generates an electric signal based on the control by the control unit 111, and transmits the electric signal based on the baseband method, which transmits the electric signal without modulating it, from the transmission coupler 104 to the reception coupler 106. Similarly, the transmission circuit 109 generates an electric signal based on the control by the control unit 112, and transmits the electric signal based on the baseband method from the transmission coupler 110 to the reception coupler 108. The reception circuit 107 transmits the electric signal received by the reception coupler 108 to the control unit 111. Similarly, the reception circuit 105 transmits the electric signal received by the reception coupler 106 to the control unit 112.

Figure 2A:
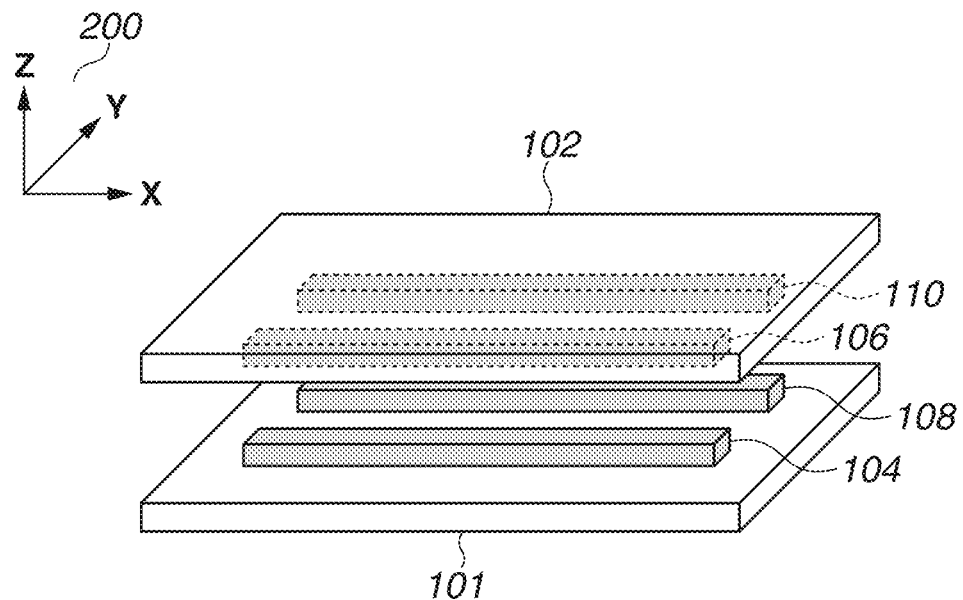
FIGS. 2A and 2B illustrate a configuration example of couplers in the wireless communication system 100.
Figure 2B:
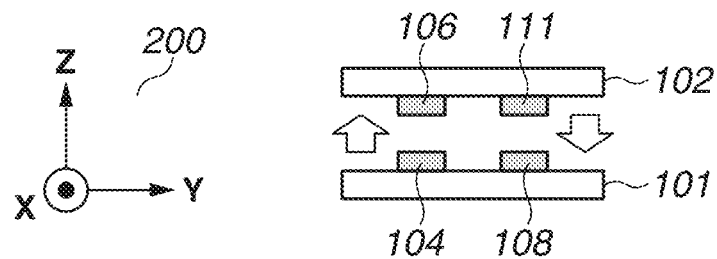

FIGS. 2A and 2B illustrate a configuration example of the transmission and reception couplers in the system 100. FIG. 2A is a perspective view of a part of the system 100, and FIG. 2B illustrates the part of the system 100 as viewed from an X-axis positive direction of a coordinate system 200 defined by an X axis, a Y axis, and a Z axis orthogonal to one another. The transmission coupler 104 and the reception coupler 108 are mounted on the same surface of a plate-like member included in the communication apparatus 101, and are positioned on substantially the same plane. The transmission coupler 110 and the reception coupler 106 are mounted on the same surface of a plate-like member included in the communication apparatus 102, and are positioned on substantially the same plane.

The transmission coupler 104 and the reception coupler 106 are located in proximity to each other and positioned to face each other in an Z-axis direction. In other words, the transmission coupler 104 and the reception 106 at least partially overlap each other when being viewed from the Z-axis direction. Similarly, the transmission coupler 110 and the reception coupler 108 are located in proximity to each other and positioned to face each other in the Z-axis direction. In such a configuration, the data transmission from the communication apparatus 101 to the communication apparatus 102 is realized by the transmission of the electric signal from the transmission coupler 104 to the reception coupler 106 in a Z-axis positive direction. The data transmission from the communication apparatus 102 to the communication apparatus 101 is realized by the transmission of the electric signal from the transmission coupler 110 to the reception coupler 108 in a Z-axis negative direction.

In FIGS. 2A and 2B, each of the couplers is illustrated as including a long side substantially in parallel with an X-axis direction, but the shape and the mounting direction of each of the couplers are not limited thereto and can be a different shape and a different direction as long as the corresponding transmission coupler and reception coupler can establish the electromagnetic field coupling therebetween. For example, the transmission coupler 110 and the reception coupler 108 can each have a long side substantially in parallel with a Y-axis direction, and the transmission coupler 104 and the reception coupler 106 can each have the long side substantially in parallel with the X-axis direction. Alternatively, the transmission coupler 110 and the reception coupler 106 can be arranged linearly in the X-axis direction, and the transmission coupler 104 and the reception coupler 108 can be arranged linearly in the X-axis direction. The shape of the coupler can be a U-shape, an L-shape, or other shapes.

Figure 3A:
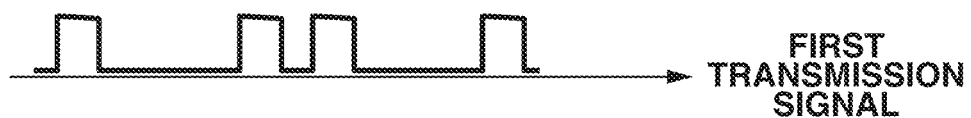
FIGS. 3A, 3B, 3C, 3D, 3E, and 3F illustrate electric signals communicated in the wireless communication system 100.
Figure 3B:
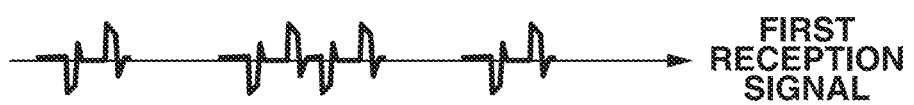
Figure 3C:
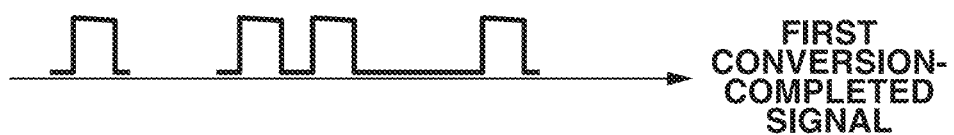
Figure 3D:
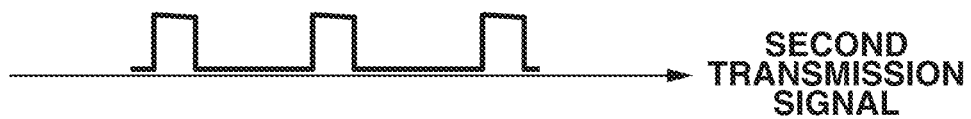

FIGS. 3A to 3F illustrate examples of waveforms of the electric signals transmitted and received when the communication apparatus 101 and the communication apparatus 102 carry out the communication based on the electric field coupling. A horizontal axis in each of FIGS. 3A to 3F indicates time. First, a first transmission signal illustrated in FIG. 3A that is generated by the transmission circuit 103 is input to the transmission coupler 104. The reception coupler 106 is coupled with the transmission coupler 104 by the electric field coupling, so that a first reception signal illustrated in FIG. 3B is generated at the reception coupler 106 based on the input of the first transmission signal to the transmission coupler 104. The reception circuit 105 performs conversion processing on this first reception signal to generate a first conversion-completed signal illustrated in FIG. 3C, which has a similar waveform to the first transmission signal. The conversion processing by the reception circuit 105 includes, for example, processing for converting a received analog signal into a digital signal by comparing this analog signal with a threshold value with use of a comparator. Transmission of a first electric signal from the communication apparatus 101 to the communication apparatus 102 is realized by the above-described process.

Figure 3E:
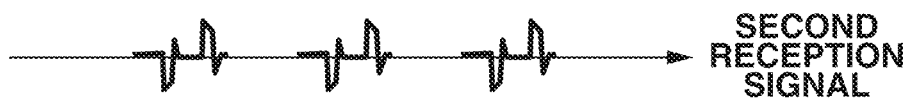
Figure 3F:
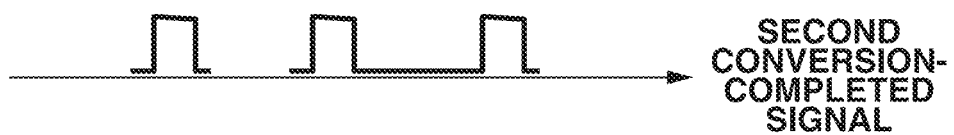

Transmission of a second electric signal from the communication apparatus 102 to the communication apparatus 101 is also realized by a similar process. More specifically, a second reception signal illustrated in FIG. 3E is generated at the reception coupler 108 based on an input of a second transmission signal illustrated in FIG. 3D, which is generated by the transmission circuit 109, to the transmission coupler 110. Then, the reception circuit 107 performs the conversion processing on this second reception signal to generate a second conversion-completed signal illustrated in FIG. 3F, which has a similar waveform to the second transmission signal.

In this manner, the provision of the transmission coupler and the reception coupler to each of the communication apparatus 101 and the communication apparatus 102 enables bidirectional communication to be carried out between the communication apparatus 101 and the communication apparatus 102. The communication apparatus 101 can carry out the data transmission and the data reception using the different couplers for each of them asynchronously, and therefore can realize high-speed communication compared to, for example, alternately carrying out the transmission and the reception with use of a single coupler in a time-sharing manner.

Figure 4:
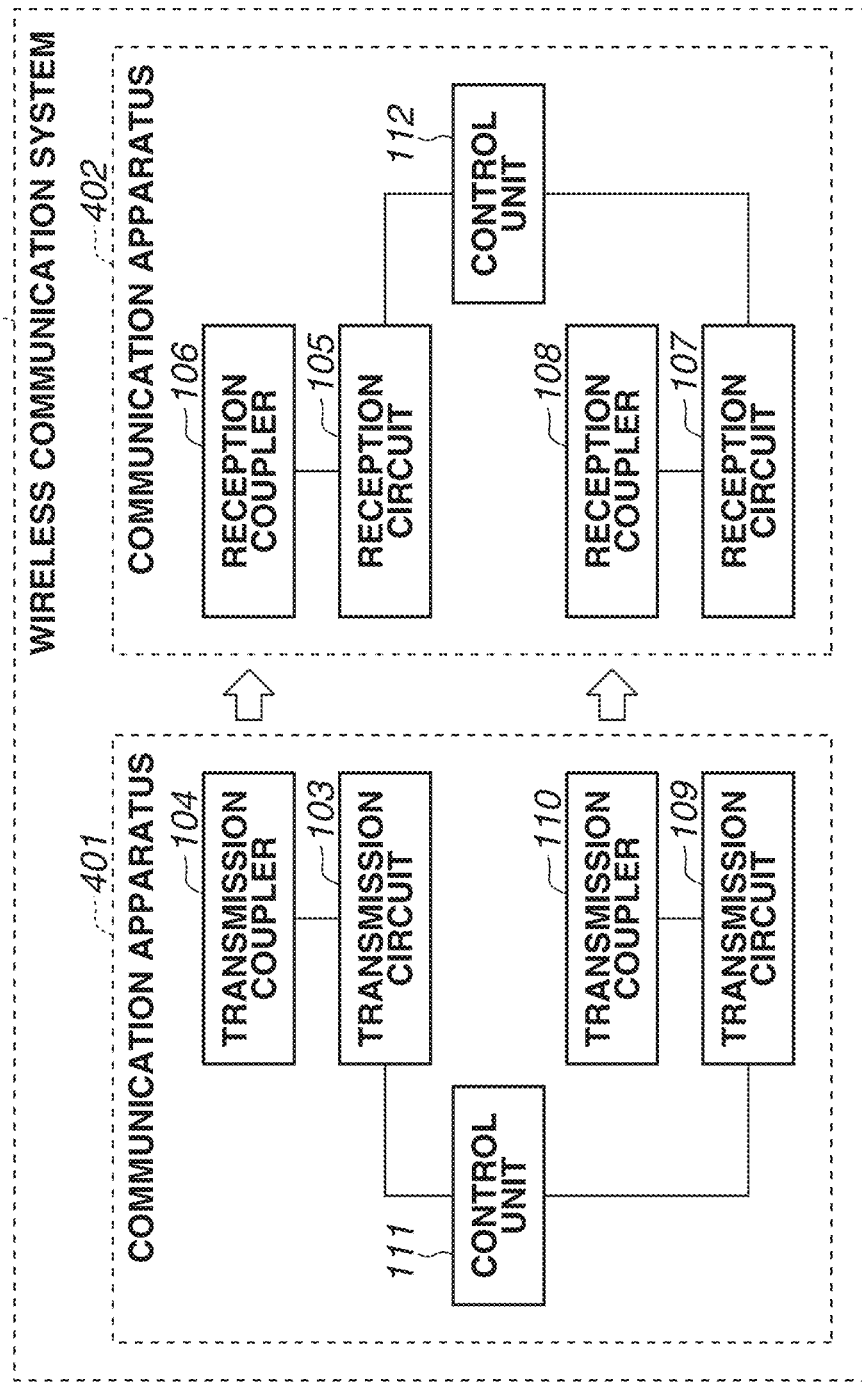
FIG. 4 illustrates a system configuration of a wireless communication system 400.

In the above description, the present exemplary embodiment has been described referring to the system 100 in which the communication apparatus 101 and the communication apparatus 102 carry out the bidirectional communication therebetween, but two or more pairs of couplers can be used for unidirectional communication. FIG. 4 illustrates a system configuration of a wireless communication system 400 (hereinafter referred to as a system 400) in which the unidirectional commutation is carried out between a communication apparatus 401 and a communication apparatus 402. The communication apparatus 401 includes the transmission circuit 103, the transmission coupler 104, the transmission circuit 109, the transmission coupler 110, and the control unit 111. The communication apparatus 402 includes the reception circuit 105, the reception coupler 106, the reception circuit 107, the reception coupler 108, and the control unit 112. Details of each of the components of the communication apparatus 401 and the communication apparatus 402 are similar to each of the components identified by the same reference numerals in FIG. 1. However, the control unit 111 does not have to perform the data reception processing, and the control unit 112 does not have to perform the data transmission processing.

In the system 400, an electric signal is transmitted from the transmission coupler 104 of the communication apparatus 401 to the reception coupler 106 of the communication apparatus 402. An electric signal is transmitted from the transmission coupler 110 of the communication apparatus 401 to the reception coupler 108 of the communication apparatus 402. If the communication apparatus 401 transmits different electric signals from the transmission coupler 104 and the transmission coupler 110 simultaneously, the system 400 enables a larger data amount to be transmitted per unit time than transmitting the electric signals from the single transmission coupler, thereby succeeding in realizing further high-speed communication.

If the communication apparatus 401 transmits the same electric signals from the transmission coupler 104 and the transmission coupler 110, even when the data transmission using one of the transmission couplers has failed due to an influence of noise or the like, the system 400 enables the data to be transmitted to the communication apparatus 402 using the other of the transmission couplers. By this effect, the system 400 can reduce processing for retransmitting the data, which would be performed, for example, according to the failure in the communication, thereby realizing further high-speed communication, compared to transmitting the electric signal from the single transmission coupler.

In FIG. 4, the communication apparatus 401 includes the two couplers for the transmission and the communication apparatus 402 includes the two couplers for the reception, but the communication apparatus 401 can include three or more couplers for the transmission and the communication apparatus 402 can include three or more couplers for the reception. Alternatively, the communication apparatus 401 can include two or more couplers for the transmission and one or more couplers for the reception, and the communication apparatus 402 can include one or more couplers for the transmission and two or more couplers for the reception.

Figure 5:
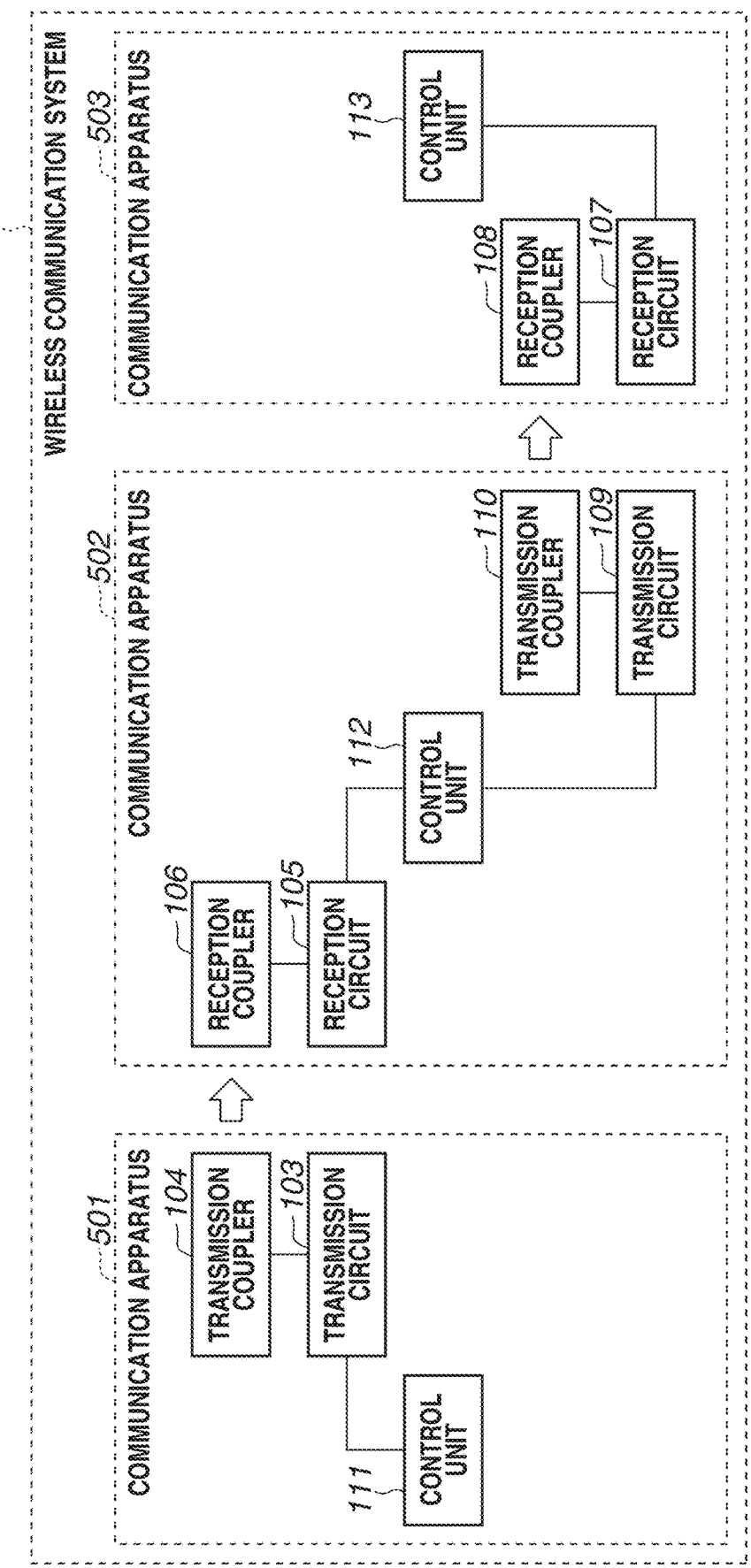
FIG. 5 is a block diagram illustrating a system configuration of a wireless communication system 500.

In FIGS. 1 and 4, the present exemplary embodiment has been described referring to the system 100 and the system 400 in which the communication is carried out between the two communication apparatuses, but the communication can be carried out among three or more communication apparatuses. FIG. 5 illustrates a system configuration of a wireless communication system 500 (herein after referred to as a system 500), in which the communication is carried out among three communication apparatuses, i.e., a communication apparatus 501, a communication apparatus 502, and a communication apparatus 503. The communication apparatus 501 includes the transmission circuit 103, the transmission coupler 104, and the control unit 111. The communication apparatus 502 includes the reception circuit 105, the reception coupler 106, the transmission circuit 109, the transmission coupler 110, and the control unit 112. The communication apparatus 503 includes the reception circuit 107, the reception coupler 108, and a control unit 113.

Details of each of the components of the communication apparatus 501, the communication apparatus 502, and the communication apparatus 503 are similar to each of the components identified by the same reference numerals in FIG. 1. The control unit 113 performs similar communication processing to the control unit 111 and the control unit 112. However, the control unit 111 does not have to perform the data reception processing, and the control unit 113 does not have to perform the data transmission processing. In the system 500, an electric signal is transmitted from the transmission coupler 104 of the communication apparatus 501 to the reception coupler 106 of the communication apparatus 502, and an electric signal is transmitted from the transmission coupler 110 of communication apparatus 502 to the reception coupler 108 of the communication apparatus 503.

In FIGS. 1, 4, and 5, the present exemplary embodiment has been described referring to the example in which the coupler for the transmission and the coupler for the reception are used while being distinguished from each other, but one coupler can be used for both the transmission and the reception. For example, the system 100 illustrated in FIG. 1 can be configured such that the reception circuit 107 includes both the function as the circuit for the reception and the function as the circuit for the transmission, and the control unit 111 switches whether to cause the reception circuit 107 to function as the circuit for the transmission or function as the circuit for the reception. When the reception circuit 107 functions as the circuit for the transmission, an electric signal is transmitted from the reception coupler 108 to the transmission coupler 110.

In the case where such processing for switching the transmission and the reception is performed in the communication apparatus 101, in the communication apparatus 102, the transmission circuit 109 also includes both the function as the circuit for the transmission and the function as the circuit for the reception, and the processing for switching the transmission and the reception is also performed by the control unit 112. In other words, whether to transmit the electric signal from the transmission coupler 110 to the reception coupler 108 or transmit the electric signal from the reception coupler 108 to the transmission coupler 110 is controlled by the control unit 111 and the control unit 112.

With such a configuration, the system 100 can control whether to carry out the bidirectional communication or carry out the unidirectional communication between the communication apparatus 101 and the communication apparatus 102. For example, one conceivable situation is that the data that should be transmitted from the communication apparatus 102 to the communication apparatus 101 occurs less frequently than the data that should be transmitted from the communication apparatus 101 to the communication apparatus 102 occurs. Under such a situation, the system 100 can carry out the bidirectional communication by transmitting the data from the transmission coupler 104 to the reception coupler 106 and also transmitting the data from the transmission coupler 110 to the reception coupler 108 during a time period when there is the data that should be transmitted from the communication apparatus 102. The system 100 can carry out the unidirectional communication by transmitting the data from the transmission coupler 104 to the reception coupler 106 and also transmitting the data from the reception coupler 108 to the transmission coupler 110 during a time period when there is not the data that should be transmitted from the communication apparatus 102. By operating in this manner, the system 100 can efficiently use the coupler according to the data that should be communicated, thereby realizing the high-speed communication.

Figure 6:
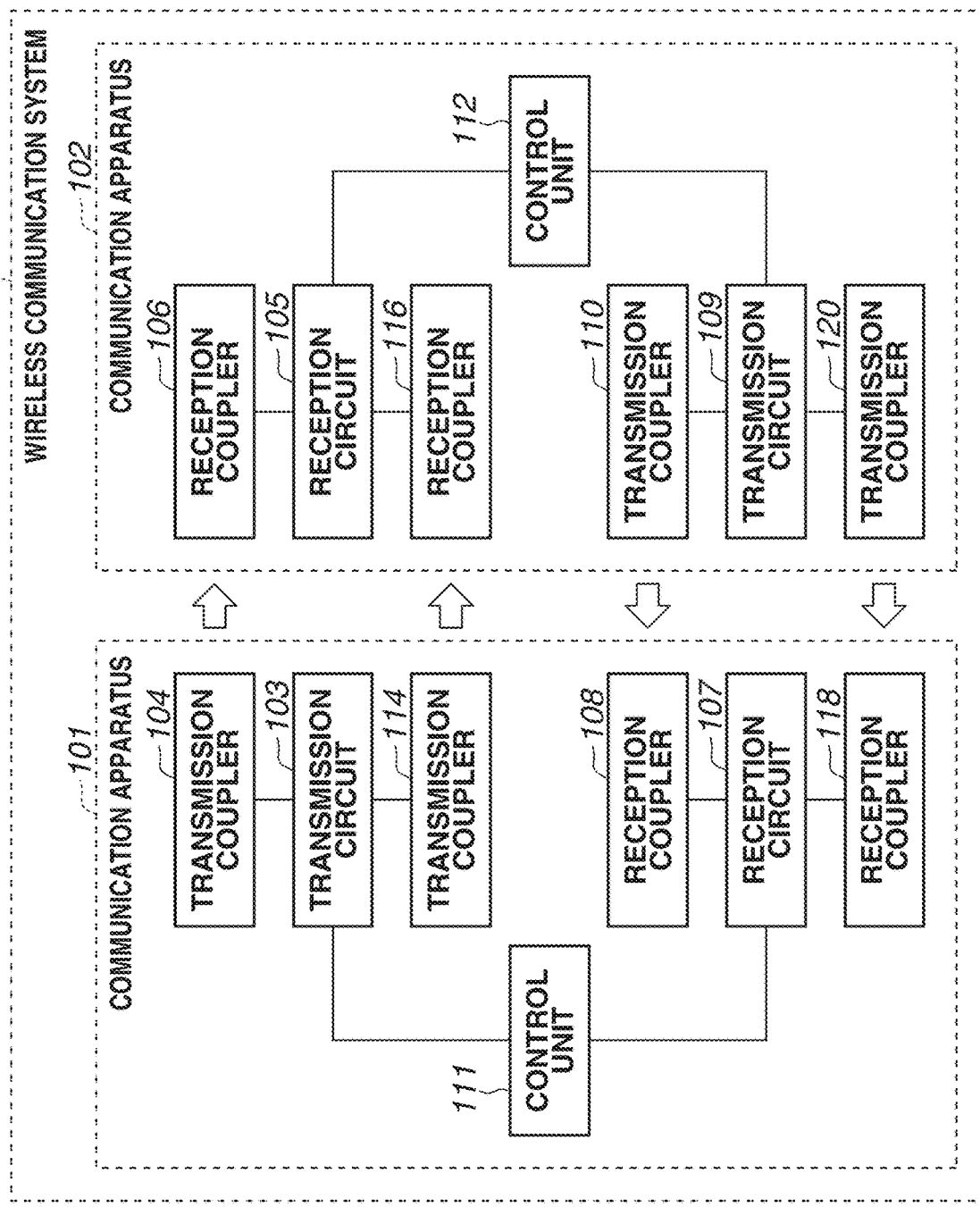
FIG. 6 is a block diagram illustrating a system configuration of a wireless communication system 600.

The present exemplary embodiment is being described focusing on the example in which the wireless communication is carried out by single-ended transmission, but is not limited thereto. The wireless communication can be carried out by differential transmission. For example, in a case where the differential transmission is applied to the system 100 illustrated in FIG. 1, the system 100 is modified as indicated by a system 600 illustrated in FIG. 6, with each of the transmission coupler 104, the reception coupler 106, the reception coupler 108, and the transmission coupler 110 being replaced with two couplers for transmitting signals opposite in phase from each other. In FIG. 6, similar components to the system 100 illustrated in FIG. 1 are identified by the same reference numerals.

In the system 600, the communication apparatus 101 includes a transmission coupler 114 and a reception coupler 118, and the communication apparatus 102 includes a reception coupler 116 and a transmission coupler 120, in addition to the configuration of the system 100. The transmission coupler 114 functions as an antenna for carrying out wireless communication based on electromagnetic field coupling with the reception coupler 116, and the transmission coupler 120 functions as an antenna for carrying out wireless communication based on electromagnetic field coupling with the reception coupler 118.

The transmission circuit 103 transmits a signal opposite in phase from the electric signal transmitted from the transmission coupler 104 to the reception coupler 106, from the transmission coupler 114 to the reception coupler 116. The transmission circuit 109 transmits a signal opposite in phase from the electric signal transmitted from the transmission coupler 110 to the reception coupler 108, from the transmission coupler 120 to the reception coupler 118. Then, the reception circuit 105 transfers a potential difference between the electric signal received by the reception coupler 106 and the electric signal received by the reception coupler 116 to the control unit 112. Similarly, the reception circuit 107 transfers a potential difference between the electric signal received by the reception coupler 108 and the electric signal received by the reception coupler 118 to the control unit 111.

The configuration like the system 600 enables the communication apparatus 101 and the communication apparatus 102 to carry out the wireless communication by the differential transmission therebetween. Using the differential transmission achieves a lower influence of external noise in the wireless communication than using the single-ended transmission. In FIG. 6, the system 600 has been described referring to the example in which the differential transmission is applied to the system 100 illustrated in FIG. 1. The differential transmission, however, can similarly be applied to the system 400 illustrated in FIG. 4 and the system 500 illustrated in FIG. 5. The differential transmission can be applied to the system including the above-described couplers that switch the transmission and the reception.

<Prevention or Reduction of Interference>

In the descriptions of the above-described drawings, FIGS. 3A to 3F, the waveforms have been described referring to the examples of the waveforms in the case where no interference occurs in the electric signals transmitted and received between the two pairs of couplers. Interference can occur in the transmitted and received electric signals depending on, for example, the positional relationship among the individual couplers. For example, suppose that, in FIG. 2, the transmission coupler 104 and the reception coupler 108 are located just a short distance away from each other in the Y-axis direction, and the reception coupler 106 and the transmission coupler 110 are located just a short distance away from each other in the Y-axis direction. In such a case, the electric signal transmitted from the transmission coupler 104 can accidentally be received by the reception coupler 108, and the electric signal transmitted from the transmission coupler 110 can accidentally be received by the reception coupler 106.

Figure 7A:
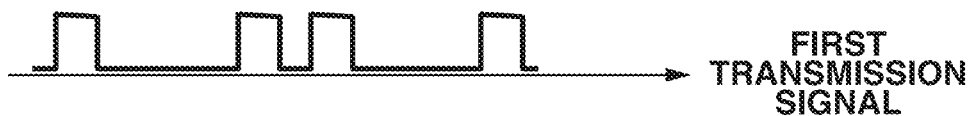
FIGS. 7A, 7B, 7C, 7D, 7E, and 7F illustrate interference of the electric signals communicated in the wireless communication system 100.
Figure 7B:
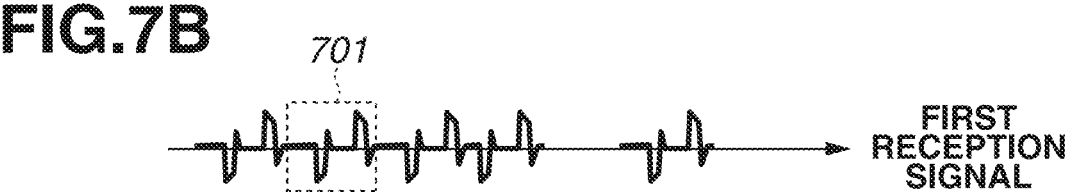
Figure 7C:
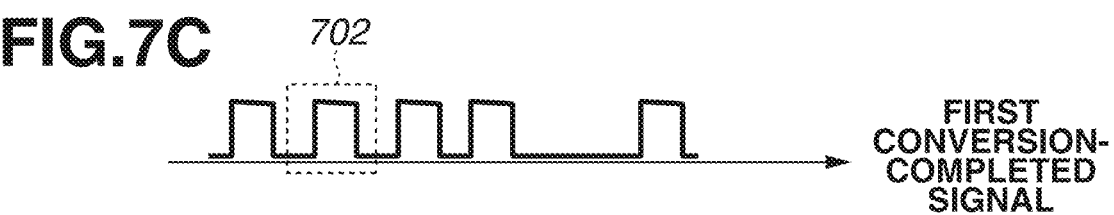
Figure 7D:
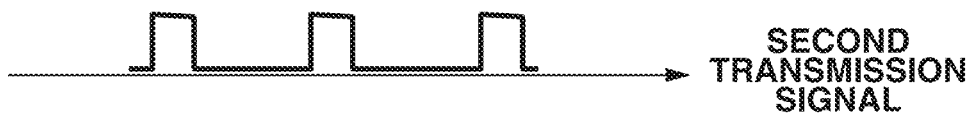
Figure 7E:
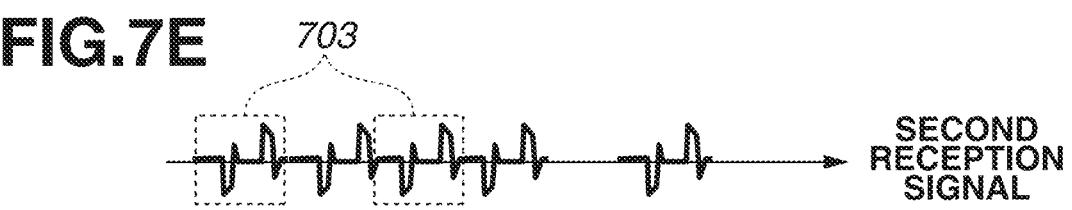
Figure 7F:
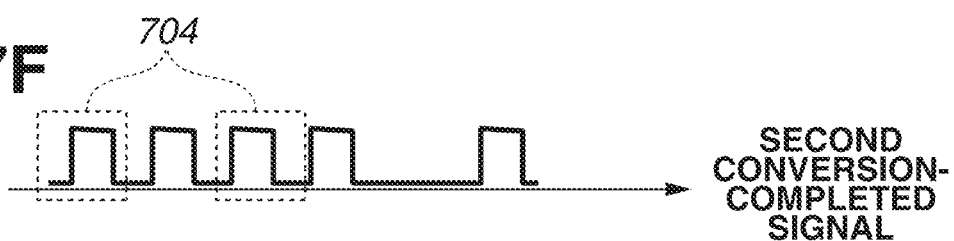

FIGS. 7A to 7F illustrate examples of waveforms of the electric signals transmitted and received between the communication apparatus 101 and the communication apparatus 102 of the system 100 in the case where the interference has occurred. A horizontal axis in each of FIGS. 7A to 7F indicates time. First, a first transmission signal illustrated in FIG. 7A that is generated by the transmission circuit 103 is input to the transmission coupler 104, and a second transmission signal illustrated in FIG. 7D that is generated by the transmission circuit 109 is input to the transmission coupler 110. At this time, the reception coupler 106 also receives the signal transmitted from the transmission coupler 110 accidentally in addition to the signal transmitted from the transmission coupler 104, and noise 701 is contained in the first reception signal generated at the reception coupler 106 as illustrated in FIG. 7B. When the conversion processing by the reception circuit 105 is performed on this first reception signal, a first conversion-completed signal containing noise 702 therein is generated as illustrated in FIG. 7C. Similarly, noise 703 is contained in the second reception signal generated at the reception coupler 108 due to an influence of the signal transmitted from the transmission coupler 104, as illustrated in FIG. 7E. Then, when the conversion processing by the reception circuit 107 is performed on the second reception signal, a second conversion-completed signal containing noise 704 therein is generated as illustrated in FIG. 7F.

In the following description, a configuration of the system 100 for preventing or reducing the occurrence of the noise due to the interference of the electric signals like the examples illustrated in FIGS. 7A to 7F will be described. The configuration that will be described below can be applied to the system 100 illustrated in FIG. 1 as well as to the above-described configurations such as the system 400 illustrated in FIG. 4 and the system 600 illustrated in FIG. 6 in a similar manner.

Figure 8A:
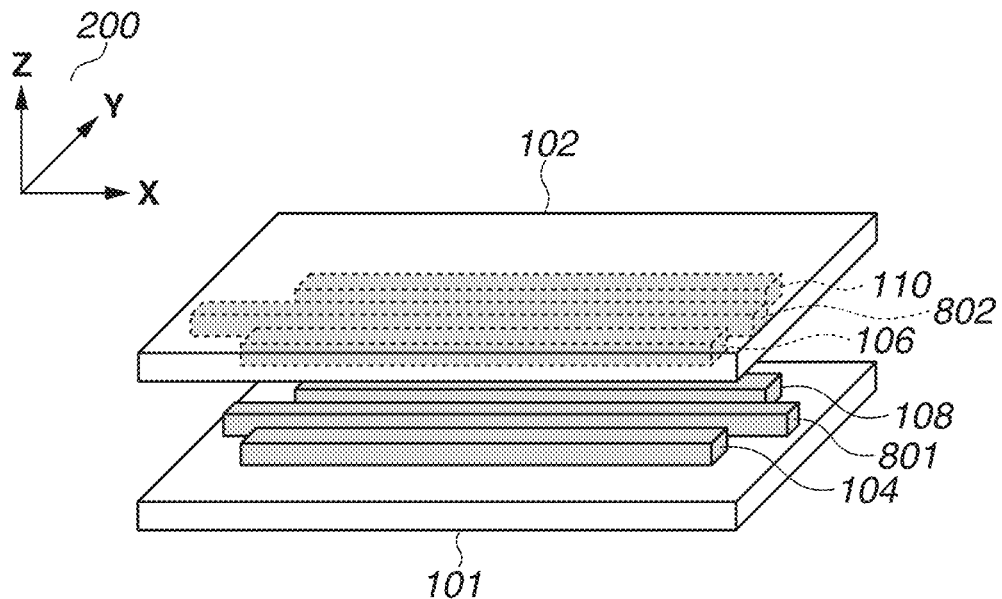
FIGS. 8A and 8B illustrate a configuration example of the wireless communication system 100 for preventing or reducing the interference of the electric signals.
Figure 8B:
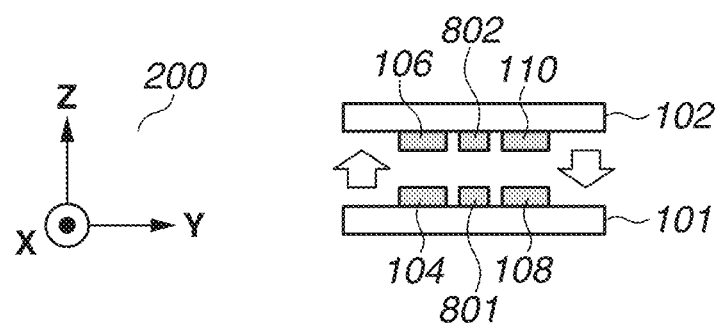

A configuration example of the system 100 for preventing or reducing the interference of the electric signals will be described with reference to FIGS. 8A and 8B. FIG. 8A is a perspective view of a part of the system 100, and FIG. 8B illustrates the part of the system 100 as viewed from the X-axis positive direction of the coordinate system 200. In FIGS. 8A and 8B, similar components to FIGS. 2A and 2B are identified by the same reference numerals.

In FIGS. 8A and 8B, the communication apparatus 101 includes a ground 801 positioned between the transmission coupler 104 and the reception coupler 108, and the communication apparatus 102 includes a ground 802 positioned between the reception coupler 106 and the transmission coupler 110, to prevent or reduce the above-described interference. Each of the ground 801 and the ground 802 is, for example, a conductor connected to a reference potential point. In FIGS. 8A and 8B, the ground 801 and the ground 802 have shapes longer in length in the X-axis direction than the couplers, but the shapes of the ground 801 and the ground 802 are not limited thereto.

The provision of the ground 801 to the communication apparatus 101 weakens the electromagnetic field coupling between the transmission coupler 104 and the reception coupler 108, thereby contributing to preventing or reducing the occurrence of the noise in the electric signal received by the reception coupler 108. Similarly, the provision of the ground 802 to the communication apparatus 102 weakens the electromagnetic field coupling between the transmission coupler 110 and the reception coupler 106, thereby contributing to preventing or reducing the occurrence of the noise in the electric signal received by the reception coupler 106. The system 100 can include only one or more of the ground 801 and the ground 802.

Alternatively, as another configuration example for preventing or reducing the interference, the couplers can be disposed such that the distance between the transmission coupler 104 and the reception coupler 108 in the Y-axis direction, and the distance between the reception coupler 106 and the transmission coupler 110 in the Y-axis direction match or exceed a predetermined distance. The above-described predetermined distance is set according to, for example, strength of the transmitted signal and/or allowable strength of noise.

Alternatively, as another configuration example for preventing or reducing the interference, the transmission and the reception can be carried out in a time-sharing manner in the communication between the communication apparatus 101 and the communication apparatus 102. More specifically, the control unit 111 and the control unit 112 can control the transmission circuit 103 and the transmission circuit 109, respectively, to prevent the electric signals from being simultaneously transmitted from the transmission coupler 104 to the reception coupler 106 and from the transmission coupler 110 to the reception coupler 108.

In the above description with reference to FIGS. 8A and 8B, the ground 801 and the ground 802 each connected to the reference potential point are assumed to be used as the conductor disposed between the transmission coupler and the reception coupler. However, the conductor disposed between the transmission coupler and the reception coupler is not limited thereto, and a conductor isolated from a so-called electric ground of the transmission circuit or the reception circuit in terms of a direct current or an alternating current can be disposed on at least one of a position between the transmission coupler 104 and the reception coupler 108 and a position between the transmission coupler 110 and the reception coupler 106.

Next, as another configuration example for preventing or reducing the interference, the system 100 including couplers with different lengths from FIGS. 2A and 2B will be described with reference to FIGS. 9A to 9D. FIG. 9A is a perspective view of a part of the system 100, and FIG. 9B illustrates the part of the system 100 as viewed from the X-axis positive direction of the coordinate system 200. FIG. 9C illustrates the part of the system 100 as viewed from the Z-axis positive direction, and FIG. 9D illustrates the part of the system 100 as viewed from the Z-axis negative direction. In FIGS. 9A to 9D, similar components to FIGS. 2A and 2B are identified by the same reference numerals. In FIGS. 9B to 9D, a reception coupler 906 and the transmission coupler 110 of the communication apparatus 102 are illustrated in white for illustrative purposes.

In the configuration illustrated in FIGS. 9A to 9D, the reception coupler 106 and the reception coupler 108 illustrated in FIGS. 2A and 2B are replaced with the reception coupler 906 and a reception coupler 908 with shorter lengths in the X-axis direction. Here, each of the couplers has a flat shape as illustrated in FIG. 9B, and therefore an area of a portion of the transmission coupler 110 that faces the reception coupler 908 is larger than an area of a portion of the transmission coupler 110 that faces the reception coupler 906. With such a configuration, weaker electromagnetic field coupling is established between the transmission coupler 110 and the reception coupler 906 than the electromagnetic field coupling between the transmission coupler 110 and the reception coupler 106 illustrated in FIGS. 2A and 2B. Similarly, weaker electromagnetic field coupling is established between the transmission coupler 104 and the reception coupler 908 than the electromagnetic field coupling between the transmission coupler 104 and the reception coupler 108 illustrated in FIGS. 2A and 2B. As a result, the system 100 can prevent or reduce the occurrence of the noise due to the interference of the electric signals transmitted and received between the communication apparatus 101 and the communication apparatus 102.

<Movement of Coupler Position>

In the above description, the present exemplary embodiment has been described referring to the example in which a positional relationship between the couplers is fixed, but relative positions of the couplers can be variable. In the following description, a configuration of the system 100 that can move the relative positions of the couplers while maintaining the state of carrying out the wireless communication will be described. The configuration that will be described below can also be applied to the above-described configurations, such as the system 400 illustrated in FIG. 4 and the system 600 illustrated in FIG. 6 in a similar manner.

Figure 10A:
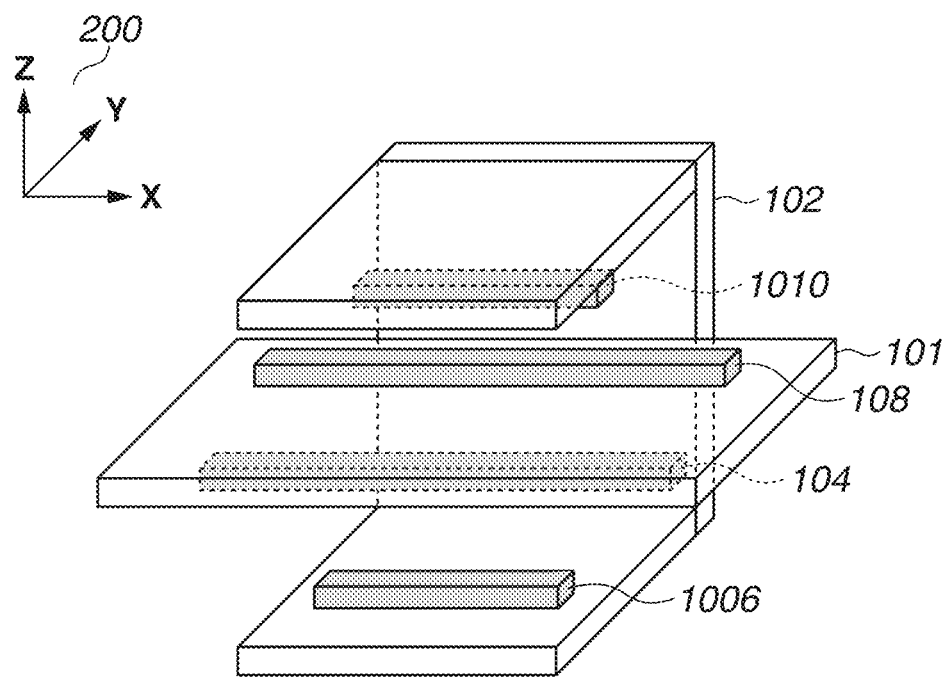
FIGS. 10A and 10B illustrate a configuration example of the wireless communication system 100 including parallelly movable couplers.
Figure 10B:
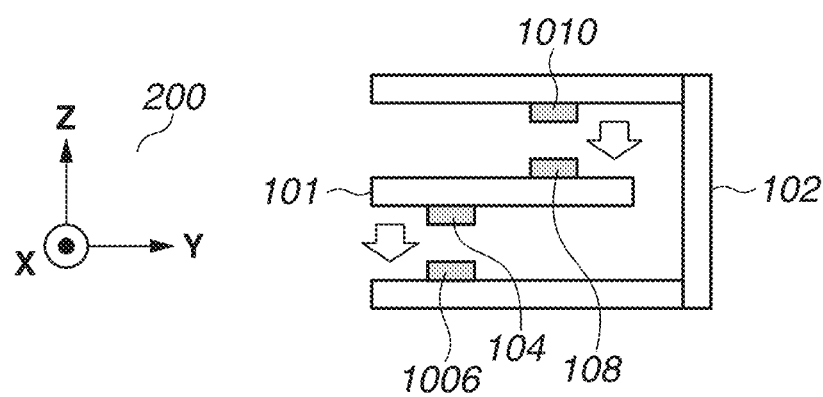

A configuration example of the system 100 including parallelly movable couplers will be described with reference to FIGS. 10A and 10B. In FIGS. 10A and 10B, similar components to FIGS. 2A and 2B are identified by the same reference numerals. Unlike the configuration in the case of FIGS. 2A and 2B, the transmission coupler 104 and the reception coupler 108 are mounted on opposite sides of the surface of the plate-like member included in the communication apparatus 101 from each other. The communication apparatus 102 includes two plate-like members to vertically surround the plate-like member included in the communication apparatus 101, with a transmission coupler 1010 mounted on one of these two plate-like members and a reception coupler 1006 mounted on the other of these two plate-like members. In other words, the transmission coupler 1010 and the reception coupler 1006 are positioned on opposite sides of the surface of the plate-like member included in the communication apparatus 101 from each other.

With such a configuration, weaker electromagnetic field coupling is established between the transmission coupler 1010 and the reception coupler 1006 than the electromagnetic field coupling between the transmission coupler 110 and the reception coupler 106 illustrated in FIGS. 2A and 2B. Weaker electromagnetic field coupling is established between the transmission coupler 104 and the reception coupler 108 than the electromagnetic field coupling in the case of FIGS. 2A and 2B. As a result, the system 100 prevents or reduces interference between an electric signal transmitted from the transmission coupler 1010 to the reception coupler 108 and an electric signal transmitted from the transmission coupler 104 to the reception coupler 1006.

The interference of the electric signals can also be prevented or reduced by setting up a ground at a position between the transmission coupler 104 and the reception coupler 108, such as an inner layer of the plate-like member included in the communication apparatus 101. In the case where the interference can be prevented or reduced in this manner, the distance between the transmission coupler 104 and the reception coupler 108 in the Y-axis direction can be shortened by, for example, mounting the transmission coupler 104 and the reception coupler 108 at corresponding positions on a back surface and a front surface of the plate-like member, respectively. As a result, this configuration also enables the communication apparatus 101 and the communication apparatus 102 to be reduced in size in the Y-axis direction.

The transmission coupler 1010 and the reception coupler 1006 illustrated in FIGS. 10A and 10B are shorter in length in the X-axis direction than the transmission coupler 110 and the reception coupler 106 illustrated in FIGS. 2A and 2B. Therefore, the transmission coupler 1010 is shorter in length in the X-axis direction than the reception coupler 108, and the reception coupler 1006 is shorter in length in the X-axis direction than the transmission coupler 104. This enables the communication apparatus 102 to be reduced in size in the X-axis direction.

The communication apparatus 102 is movable in the X-axis direction of the coordinate system 200 while keeping the transmission coupler 1010 and the reception coupler 108 facing each other and the transmission coupler 104 and the reception coupler 1006 facing each other. Control of the movement of the communication apparatus 102 can be realized by, for example, controlling a driving unit (not illustrated) included in the communication apparatus 102 by the control unit 112. This control of the movement enables a position of the transmission coupler 1010 relative to the reception coupler 108, and a position of the transmission coupler 104 relative to the reception coupler 1006 to be moved in the X-axis direction.

The communication apparatus 101 can be moved in the X-axis direction instead of the communication apparatus 102, or both the communication apparatus 101 and the communication apparatus 102 cam be moved. The direction in which the couplers are moved is not limited to the X-axis direction and can be another direction. Without being limited to the range that keeps the transmission coupler and the reception coupler facing each other, the couplers can be moved in a range that enables the communication based on the electromagnetic field coupling to be carried out between the transmission coupler and the reception coupler. In the system 100 described with reference to FIGS. 2A and 2B, 8A and 8B, and 9A, 9B, 9C, and 9D, at least one or more of the communication apparatus 101 and the communication apparatus 102 can be moved in the X-axis direction.

Figure 11A:
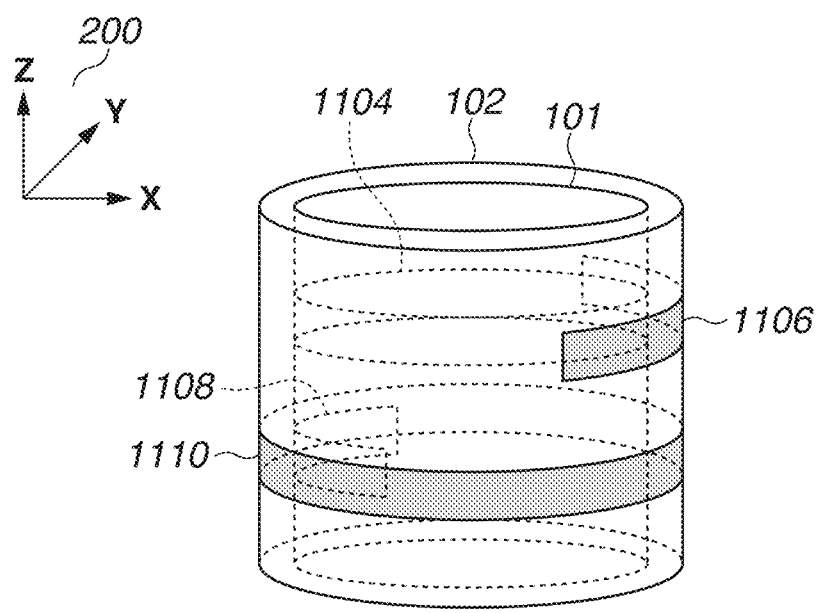
FIGS. 11A, 11B, and 11C illustrate a configuration example of the wireless communication system 100 including rotatably movable couplers.
Figure 11B:
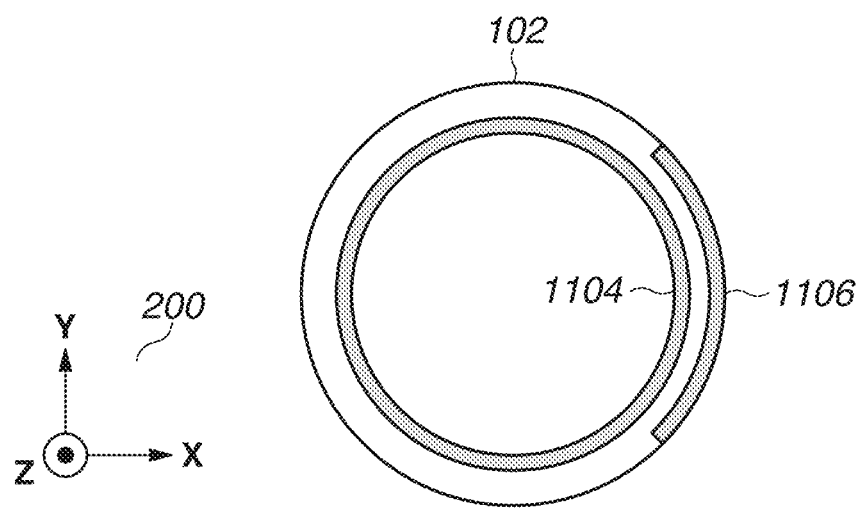
Figure 11C:
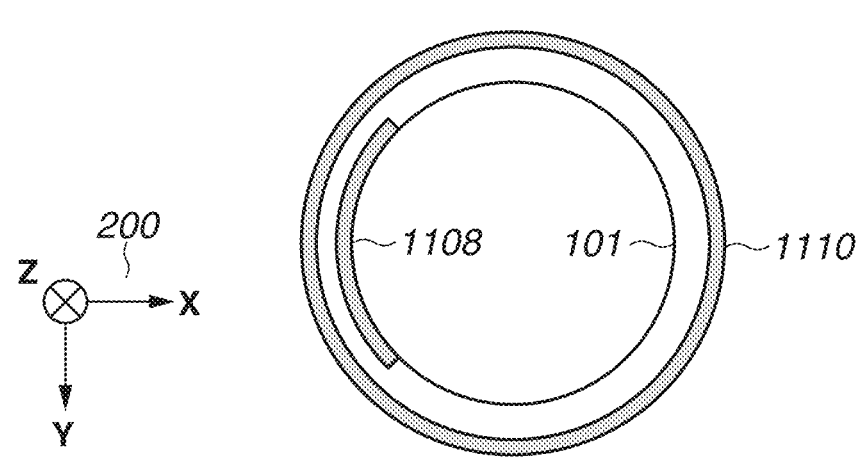

Next, a configuration example of the system 100 including rotationally movable couplers will be described with reference to FIGS. 11A, 11B, and 11C. FIG. 11A is a perspective view of a part of the system 100. FIG. 11B illustrates the part of the system 100 as viewed from the Z-axis positive direction of the coordinate system 200. FIG. 11C illustrates the part of the system 100 as viewed from the Z-axis negative direction. In FIGS. 11A, 11B, and 11C, components similar to those in FIGS. 2A and 2B are identified by the same reference numerals.

A transmission coupler 1104 and a reception coupler 1108 are mounted on a cylindrical member included in the communication apparatus 101, and a transmission coupler 1110 and a reception coupler 1106 are mounted on a cylindrical member included in the communication apparatus 102. The cylindrical member included in the communication apparatus 101 and the cylindrical member included in the communication apparatus 102 include central axes substantially coinciding with each other and different diameters from each other. The transmission coupler 1104 faces the reception coupler 1106 and the transmission coupler 1110 faces the reception coupler 1108. In other words, the reception coupler 1108 and the transmission coupler 1110 are positioned substantially on circumferences of circles centered at the same point as each other and having different diameters from each other, respectively. The transmission coupler 1104 and the reception coupler 1106 are positioned substantially on circumferences of circles centered at the same point as each other and having different diameters from each other, respectively.

In such a configuration, an electric signal is transmitted from the transmission coupler 1104 to the reception coupler 1106 based on electromagnetic field coupling, and an electric signal is transmitted from the transmission coupler 1110 to the reception coupler 1108 based on electromagnetic field coupling. A diameter of a cylinder along a portion of which the transmission coupler 1104 is mounted and a diameter of a cylinder along a portion of which the reception coupler 1108 is mounted can be different from each other. Similarly, a diameter of a cylinder along a portion of which the transmission coupler 1110 is mounted and a diameter of a cylinder along a portion of which the reception coupler 1106 is mounted can be different from each other.

The communication apparatus 102 is rotationally movable around the central axis of the cylindrical member (axis in the Z-axis direction) while keeping the transmission coupler 1104 and the reception coupler 1106 to face each other and the transmission coupler 1110 and the reception coupler 1108 to face each other. Control of the movement of the communication apparatus 102 can be realized by, for example, controlling a driving unit (not illustrated) included in the communication apparatus 102 by the control unit 112. This control of the movement enables the transmission coupler 1110 and the reception coupler 1106 to be rotationally moved. The communication apparatus 101 can be rotationally moved around the central axis of the cylindrical member instead of the communication apparatus 102, thereby causing the transmission coupler 1104 and the reception coupler 1108 to be rotationally moved. Alternatively, both the communication apparatus 101 and the communication apparatus 102 can be rotationally moved.

As illustrated in FIGS. 11B and 11C, the reception coupler 1106 and the reception coupler 1108 each have an arc shape from a viewpoint of a reference direction (Z-axis direction) substantially in parallel with the central axis of the cylindrical member. The transmission coupler 1104 and the transmission coupler 1110 each have a substantially circular shape from the viewpoint of this reference direction. The transmission coupler 1104 with the substantially circular shape enables the transmission coupler 1104 and the reception coupler 1106 to face each other regardless of how large the rotational angle is with respect to the rotational movement of the reception coupler 1106. The reception coupler 1106 with the arc shape can weaken the electromagnetic field coupling between the transmission coupler 1110 and the reception coupler 1106 compared to the reception coupler 1106 with a substantially circular shape. The same applies to the shapes of the transmission coupler 1110 and the reception coupler 1108. As a result, the system 100 prevents or reduces the interference between the electric signal transmitted from the transmission coupler 1104 to the reception coupler 1106, and the electric signal transmitted from the transmission coupler 1110 to the reception coupler 1108.

The interference can also be prevented or reduced by disposing a ground on one or more of a position between the transmission coupler 1104 and the reception coupler 1108 of the communication apparatus 101 and a position between the reception coupler 1106 and the transmission coupler 1110 of the communication apparatus 102.

The shape of each of the couplers is not limited to the example illustrated in FIGS. 11A, 11B, and 11C. For example, one or more of the transmission coupler 1104 and the transmission coupler 1110 can have an arc shape, and at least any one of the reception coupler 1106 and the reception coupler 1108 can have a substantially circular shape. Alternatively, both the transmission coupler 1104 and the reception coupler 1106 can each have an arc shape. In this case, the couplers can be rotationally moved only in a range enabling the transmission coupler 1104 and the reception coupler 1106 to face each other or a range enabling the communication based on the electromagnetic field coupling to be carried out between the transmission coupler 1104 and the reception coupler 1106. The same applies in a case where both the transmission coupler 1110 and the reception coupler 1108 each have an arc shape.

As an exemplary modification of the configuration illustrated in FIGS. 11A, 11B, and 11C, the system 100 can be configured as if the configuration illustrated in FIGS. 10A and 10B is rounded around the Y-axis direction. More specifically, the configuration illustrated in FIGS. 11A, 11B, and 11C can be configured in the following manner. The reception coupler 108 and the transmission coupler 104 are mounted on an inner surface and an outer surface of a cylindrical member included in the communication apparatus 101, respectively. The communication apparatus 102 sandwiches this cylindrical member in such a manner that the transmission coupler 1010 mounted on the communication apparatus 102 is positioned inside this cylindrical member and the reception coupler 1006 mounted on the communication apparatus 102 is positioned outside this cylindrical member. Similarly, the transmission coupler 104 and the reception coupler 108 can be mounted on the inner surface and the outer surface of the cylindrical member included in the communication apparatus 101, respectively. In such a configuration, one or more of the communication apparatus 101 and the communication apparatus 102 can be rotationally moved around the Y-axis direction.

In this exemplary modification, the interference of the electric signals can be prevented or reduced by disposing a ground between the transmission coupler 104 and the reception coupler 108, such as the inner layer of the cylindrical member included in the communication apparatus 101. In the case where the interference can be prevented or reduced in this manner, the distance between the transmission coupler 104 and the reception coupler 108 in the Y-axis direction can be shortened by, for example, mounting the transmission coupler 104 and the reception coupler 108 at corresponding positions on the inner surface and the outer surface of the cylindrical member, respectively. As a result, this configuration enables the communication apparatus 101 and the communication apparatus 102 to be reduced in size in the Y-axis direction.

<Specific Configuration Example of Coupler>

FIGS. 12A, 12B, and 12C illustrate specific configuration examples of the couplers in the wireless communication system 600 to which the differential transmission is applied, which has been described above with reference to FIG. 6. FIGS. 12A, 12B, and 12C illustrate specific configuration examples of the couplers in cases where the wireless communication is realized by the electric field coupling, the magnetic field coupling, and the electric field and magnetic field coupling, respectively. Hereinafter, the couplers illustrated in FIGS. 12A, 12B, and 12C will be referred to as a coupler for electric field coupling, a coupler for magnetic field coupling, and a coupler for electromagnetic field coupling, respectively.

In the coupler for electric field coupling illustrated in FIG. 12A, the transmission coupler formed by the two conductors (transmission coupler 104 and transmission coupler 114) is electrically opened at an opposite end from a power supply point (P1) connected to the transmission circuit 103. Similarly, the reception coupler formed by the two conductors (reception coupler 106 and reception coupler 116) is electrically opened at an opposite end from a power supply point (P2) connected to the reception circuit 105. In the coupler for magnetic field coupling illustrated in FIG. 12B, the opposite ends of the transmission coupler and the reception coupler from the power supply points (P1 and P2) are electrically short-circuited by a conductor 1200 and a conductor 1201, respectively. In the coupler for electromagnetic field coupling illustrated in FIG. 12C, a resistor 1202 substantially matching a characteristic impedance of a transmission line connecting the transmission circuit 103 and the transmission coupler therebetween is inserted at the opposite end of the transmission coupler from the power supply point (P1). Similarly, a resistor 1203 substantially matching a characteristic impedance of a transmission line connecting the reception circuit 105 and the reception coupler therebetween is inserted at the opposite end of the reception coupler from the power supply point (P2).

The shapes of the couplers based on each of the methods illustrated in FIGS. 12A to 12C are just one example, and are not limited thereto as long as the couplers have the above-described characteristics. The wireless communication using the couplers configured as illustrated in FIGS. 12A, 12B, and 12C is not limited to the differential transmission, and the wireless communication by the single-ended transmission can be carried out using the couplers configured as illustrated in FIGS. 12A, 12B, and 12C.

<Prevention or Reduction of Interference by Shield Insertion>

Figure 13A:
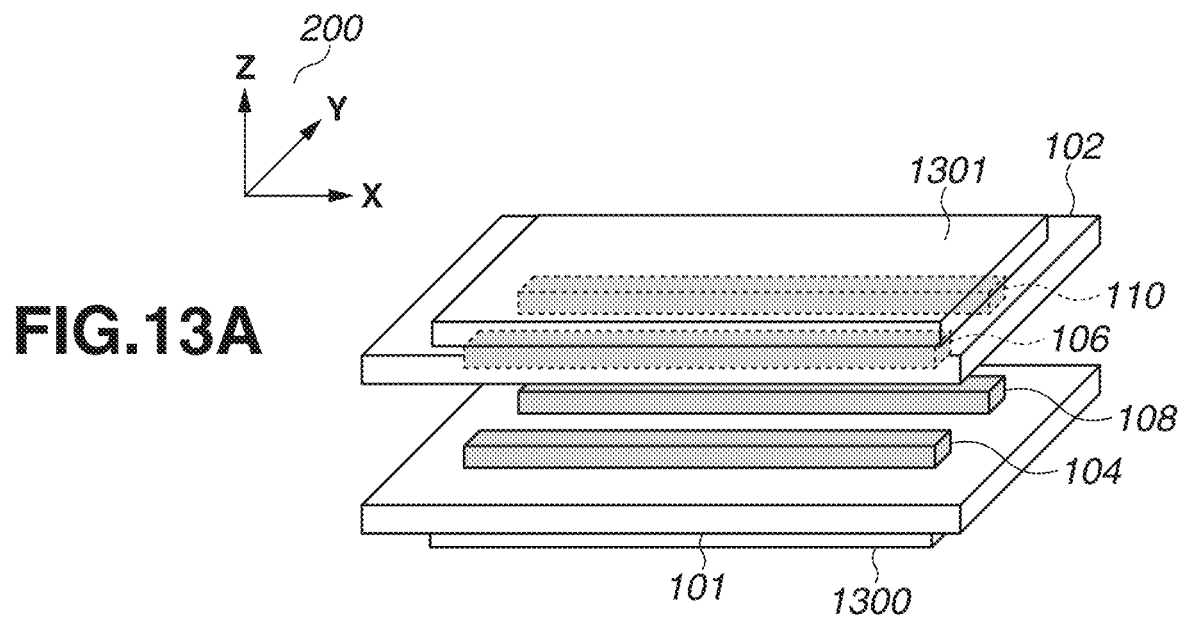
FIGS. 13A, 13B, and 13C illustrate a configuration example of the wireless communication system 100 for preventing or reducing the interference of the electric signals with use of a shield conductor.
Figure 13B:
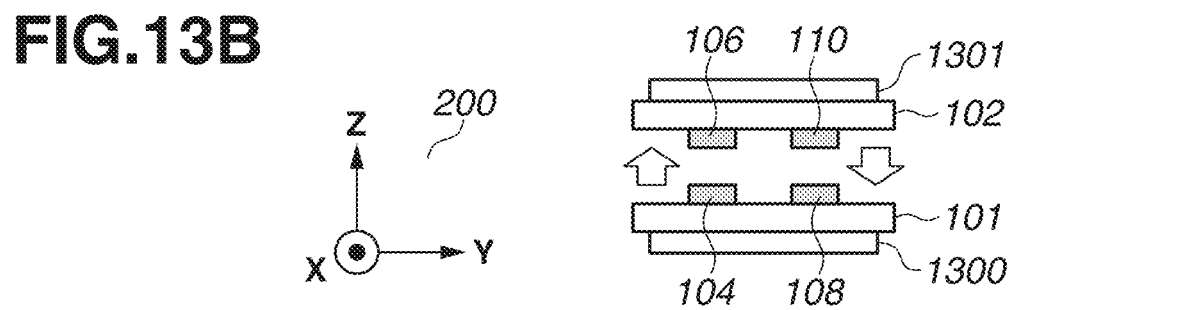
Figure 13C:
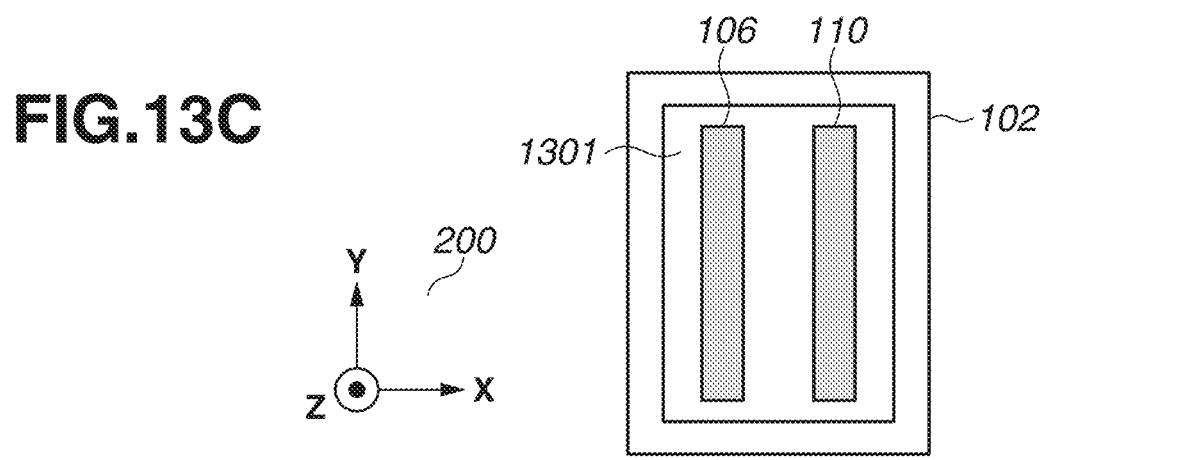

The configuration of the system 100 for preventing or reducing the interference of the electric signals has been described above with reference to FIGS. 8A and 8B, and 9A, 9B, 9C, and 9D, and, in the following description, another configuration example of the system 100 for preventing or reducing the interference will be described with reference to FIGS. 13A, 13B, and 13C. FIG. 13A is a perspective view of a part of the system 100, and FIG. 13B illustrates the part of the system 100 as viewed from the X-axis positive direction of the coordinate system 200. FIG. 13C illustrates the part of the system 100 as viewed from the Z-axis positive direction of the coordinate system 200. In FIG. 13C, the configuration of the communication apparatus 101 side is omitted and only the configuration of the communication apparatus 102 side is illustrated.

In the configuration illustrated in FIGS. 13A, 13B, and 13C, the communication apparatus 101 includes a plate-like shield conductor 1300. The shield conductor 1300 is disposed to overlap the transmission coupler 104 and the reception coupler 108 when being viewed from the Z-axis positive direction, and is also disposed on an opposite side of the transmission coupler 104 and the reception coupler 108 from the transmission coupler 110 and the reception coupler 106. In other words, the shield conductor 1300 is disposed to cover the transmission coupler 104 and the reception coupler 108 when being viewed from the Z-axis negative direction. Similarly, the communication apparatus 102 includes a shield conductor 1301, and the shield conductor 1301 is disposed to cover the transmission coupler 110 and the reception coupler 106 when being viewed from the Z-axis positive direction.

The interference of the electric signals that is generated between the transmission coupler 104 and the reception coupler 108 like the example described with reference to FIGS. 7A to 7F can be prevented or reduced by disposing the shield conductor close to the couplers in the above-described manner. The shield conductors 1300 and 1301 can be any members as long as they are conductors, and, for example, are made using aluminum, copper, or the like. In a case where a substrate pattern such as Flame Retardant Type 4 (FR4) is used, the shield conductors 1300 and 1301 can be each formed using a conductor layer that is a surface layer different from the layer on which the couplers are formed or an inner layer. The shield conductors 1300 and 1301 can be connected in terms of a direct current to or isolated in terms of a direct current/alternating current from the electric ground of the transmission circuit or the reception circuit. The shield conductor can be provided to only any one of the communication apparatus 101 and the communication apparatus 102. The shield conductors 1300 and 1301 do not have to entirely cover the transmission coupler and the reception coupler when being viewed from the Z-axis direction, and can be configured in a different manner as long as at least a part of the transmission coupler or the reception coupler and the shield conductor overlap each other.

Figure 14A:
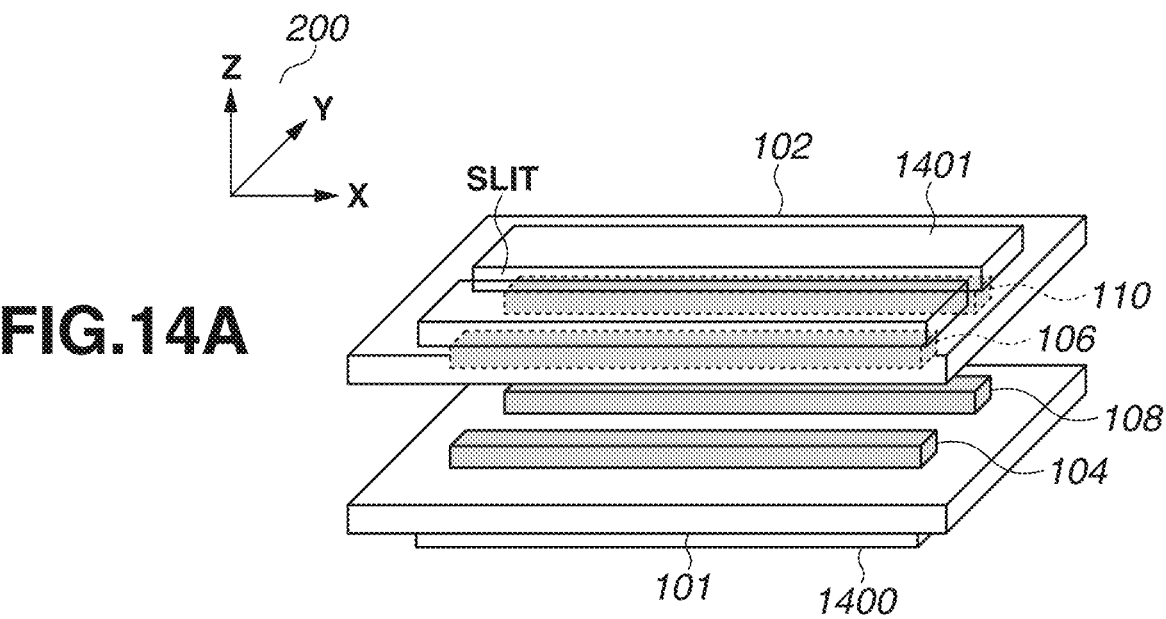
FIGS. 14A, 14B, and 14C illustrate a configuration example of the wireless communication system 100 for preventing or reducing the interference of the electric signals with use of a shield conductor having a slit.
Figure 14B:
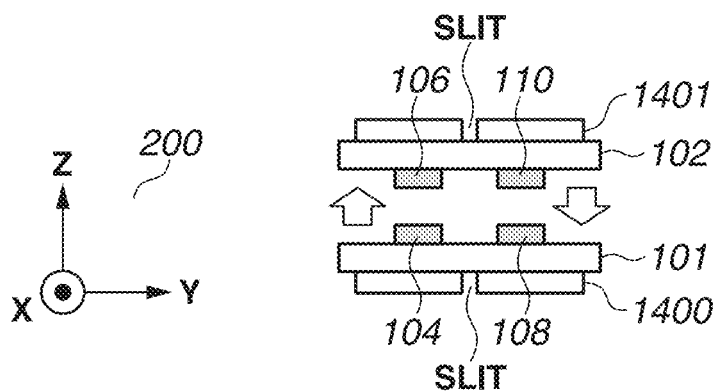
Figure 14C:
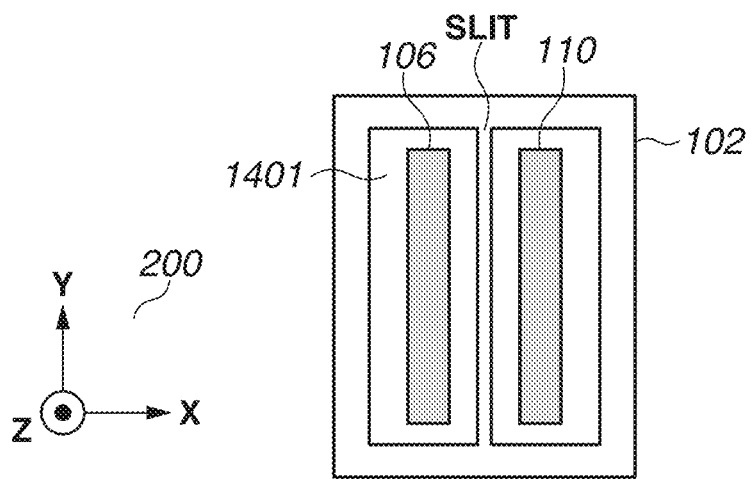

The interference of the electric signals between the couplers can be prevented or reduced by using a shield conductor including a slit. This configuration will be described with reference to FIGS. 14A, 14B, and 14C. FIG. 14A is a perspective view of a part of the system 100, and FIG. 14B illustrates the part of the system 100 as viewed from the X-axis positive direction of the coordinate system 200. FIG. 14C illustrates the part of the system 100 as viewed from the Z-axis positive direction of the coordinate system 200. In FIG. 14C, the configuration of the communication apparatus 101 side is omitted and only the configuration of the communication apparatus 102 side is illustrated.

In the configuration illustrated in FIGS. 14A, 14B, and 14C, the communication apparatus 101 and the communication apparatus 102 include a shield conductor 1400 and a shield conductor 1401 with slits inserted therein, respectively. The slit included in the shield conductor 1400 is positioned between the transmission coupler 104 and the reception coupler 108 when being viewed from the Z-axis direction. Similarly, the slit included in the shield conductor 1401 is positioned between the transmission coupler 110 and the reception coupler 106 when being viewed from the Z-axis direction.

The interference of the electric signals due to the coupling between the transmission coupler 104 and the reception coupler 108 via the shield conductor 1400 can be prevented or reduced by disposing the shield conductor 1400 including the slit close to the couplers in the above-described manner. The methods for preventing or reducing the interference of the electric signals between the couplers that have been described with reference to FIGS. 13A, 13B, and 13C, and 14A, 14B, and 14C are especially effective in the case where the coupler for electric field coupling is used.

<Sliding Movement of Coupler>

The configuration example of the system 100 including the parallelly movable couplers has been described above with reference to FIGS. 10A and 10B, and an example in a case where couplers configured in a different manner from FIGS. 10A and 10B are applied to the parallelly movable system 100 will be described with reference to FIGS. 15A and 15B. FIG. 15A is a perspective view of a part of the system 100, and FIG. 15B illustrates the part of the system 100 as viewed from the X-axis positive direction of the coordinate system 200.

In the configuration illustrated in FIGS. 15A and 15B, the transmission coupler 104 and the reception coupler 108 included in the communication apparatus 101 are substantially equal in length, and are arranged side by side in the Y-axis direction. The transmission coupler 104 and the reception coupler 108 are shorter in length in the X-axis direction compared to a transmission coupler 1510 and a reception coupler 1506 included in the communication apparatus 102. The communication apparatus 101 is movable in the X-axis direction in a range where the transmission coupler 104 and the reception coupler 1506 overlap each other and the transmission coupler 1510 and the reception coupler 108 overlap each other when being viewed from the Z-axis positive direction, i.e., a range where the communication apparatus 101 and the communication apparatus 102 are efficiently communicable with each other. The communication apparatus 102 can be moved in a similar range instead of the communication apparatus 101, or both the communication apparatus 101 and the communication apparatus 102 can be moved.

In the configuration example illustrated in FIGS. 15A and 15B, a ground conductor can be disposed between the transmission coupler 104 and the reception coupler 108 and/or between the transmission coupler 1510 and the reception coupler 1506 as described with reference to FIGS. 8A and 8B for the purpose of preventing or reducing the interference of the electric signal between the couplers. Alternatively, in the configuration example illustrated in FIGS. 15A and 15B, a shield conductor can be provided as described with reference to FIGS. 13A, 13B, and 13C, and 14A, 14B, and 14C for the purpose of preventing or reducing the interference of the electric signal between the couplers.

In the configuration examples illustrated in FIGS. 9A, 9B, 9C, and 9D, and 10A and 10B, the configuration for preventing or reducing the interference such as the above-described ground and shield can be applied for the purpose of preventing or reducing the interference of the electric signal between the couplers. The plurality of above-described methods for preventing or reducing the interference can be used in combination in a single system.

<Rotationally Movable System (Three-Dimensional Type)>

In the above description made referring to FIGS. 11A, 11B, and 11C, the configuration enabling the couplers to be rotationally moved by disposing them on the cylindrical members has been described focusing on the example in which the transmission coupler and the reception coupler have different lengths from each other, but is not limited thereto. For example, in a case where the transmission coupler and the reception coupler are disposed away from each other by a distance long enough to raise no problem regarding the interference of the electric signals between the transmission coupler and reception coupler disposed on one of the communication apparatuses 101 and 102, the transmission coupler and the reception coupler can have equal lengths to each other as illustrated in FIGS. 16A, 16B, and 16C. In the configuration illustrated in FIGS. 16A, 16B, and 16C, the communication apparatus 101 includes a transmission coupler 1604 and a reception coupler 1608, and the communication apparatus 102 includes a transmission coupler 1610 and a reception coupler 1606. The transmission coupler 1604 carries out communication with the reception coupler 1606, and the transmission coupler 1610 carries out communication with the reception coupler 1608. Such a configuration also enables the communication to be carried out while at least one of the communication apparatus 101 and the communication apparatus 102 is rotationally moved around the Z axis similarly to the configuration described above with reference to FIGS. 11A, 11B, and 11C.

In the configuration example illustrated in FIGS. 16A, 16B, and 16C, a ground conductor can be disposed between the transmission coupler 1604 and the reception coupler 1608 and/or the reception coupler 1606 and the transmission coupler 1610 as described with reference to FIGS. 8A and 8B for the purpose of preventing or reducing the interference of the electric signal between the couplers. Alternatively, in the configuration example illustrated in FIGS. 16A, 16B, and 16C, a shield conductor can be provided as described with reference to FIGS. 13A, 13B, and 13C, and 14A, 14B, and 14C for the purpose of preventing or reducing the interference of the electric signal between the couplers.

Figure 17A:
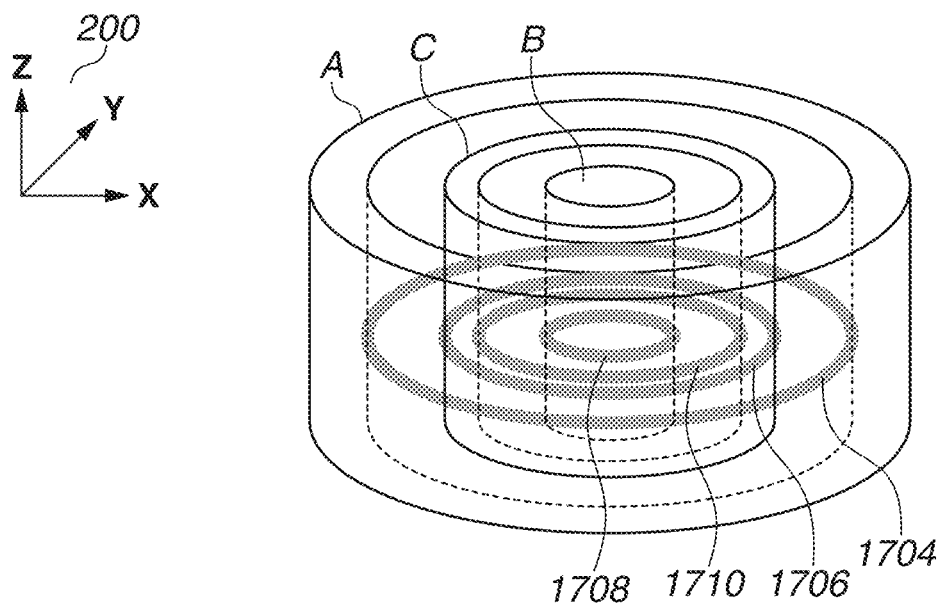
FIGS. 17A and 17B illustrate another configuration example of the wireless communication system 100 including the rotatably movable couplers.
Figure 17B:
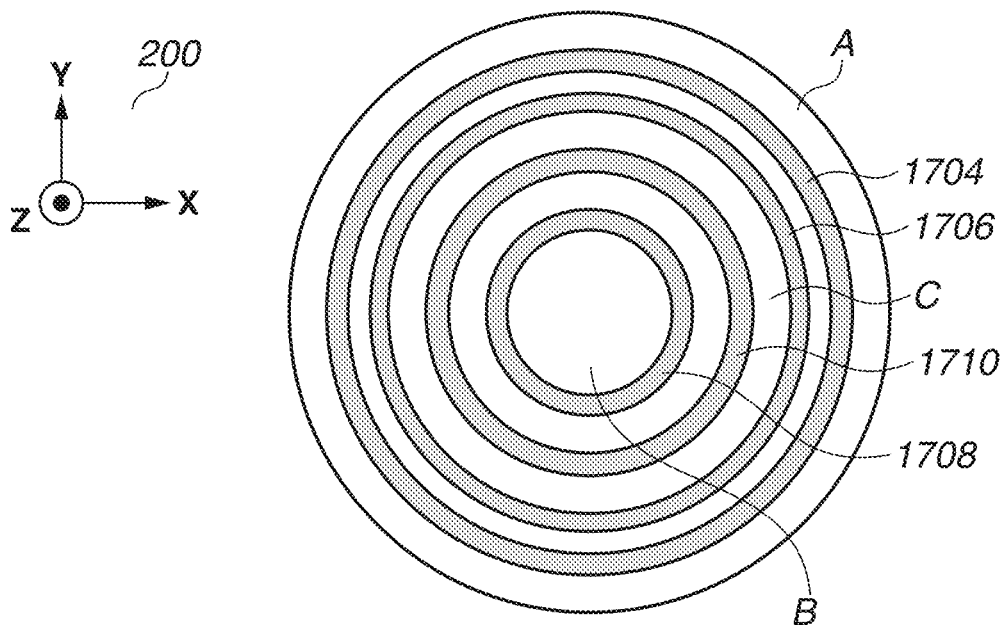

In the configuration illustrated in FIGS. 16A, 16B, and 16C, the transmission coupler and the reception coupler are assumed to be disposed on the same surface of the cylindrical member in each of the communication apparatus 101 and the communication apparatus 102. However, the positions of the transmission coupler and the reception coupler are not limited thereto, and the transmission coupler and the reception coupler can be disposed on different surfaces of the cylindrical member as illustrated in FIGS. 17A and 17B for the purpose of preventing or reducing the interference of the electric signal between the couplers. In the configuration illustrated in FIGS. 17A and 17B, the communication apparatus 101 includes a cylindrical member A and a cylindrical member B, and the communication apparatus 102 includes a cylindrical member C. The cylindrical member C is disposed inside the cylindrical member A, and the cylindrical member B is disposed further inside the cylindrical member C. A transmission coupler 1704 included in the communication apparatus 101 is disposed on an inner surface of the cylindrical member A, and carries out communication with a reception coupler 1706 included in the communication apparatus 102 that is disposed on an outer surface of the cylindrical member C. A transmission coupler 1710 included in the communication apparatus 102 is disposed on an inner surface of the cylindrical member C, and carries out communication with a reception coupler 1708 included in the communication apparatus 101 that is disposed on an outer surface of the cylindrical member B.

Such a configuration also enables the communication to be carried out while at least one of the communication apparatus 101 and the communication apparatus 102 is rotationally moved around the Z axis similarly to the configurations described with reference to FIGS. 11A, 11B, and 11C, and 16A, 16B, and 16C. In this case, each of the cylindrical members is supported by a structure not obstructing the rotational movement so that a positional relationship thereof is not largely changed.

A cylindrical shield conductor can be provided inside the cylindrical member C to be sandwiched between the reception coupler 1706 and the transmission coupler 1710 for the purpose of preventing or reducing the interference of the electric signals between the reception coupler 1706 and the transmission coupler 1710 included in the communication apparatus 102. This shield conductor can be connected in terms of a direct current to or can be configured to be isolated in terms of a direct current/alternating current from the electric ground of the transmission circuit or the reception circuit. In the configuration examples illustrated in FIGS. 11A, 11B, and 11C, 16A, 16B, and 16C, and 17A and 17B, the plurality of configurations for preventing or reducing the interference of the electric signal between the couplers can be used in combination.

<Rotationally Movable System (Planar Type)>

Figure 18A:
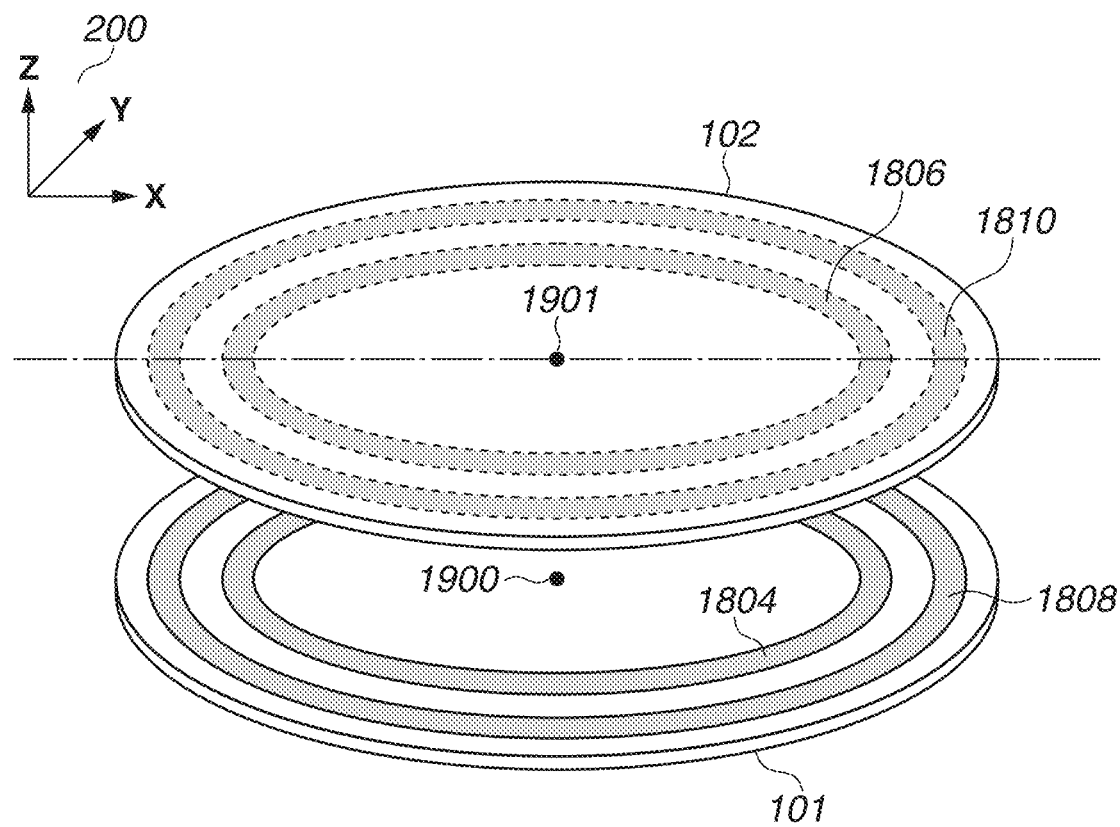
FIGS. 18A and 18B illustrate another configuration example of the wireless communication system 100 including the rotatably movable couplers.
Figure 18B:
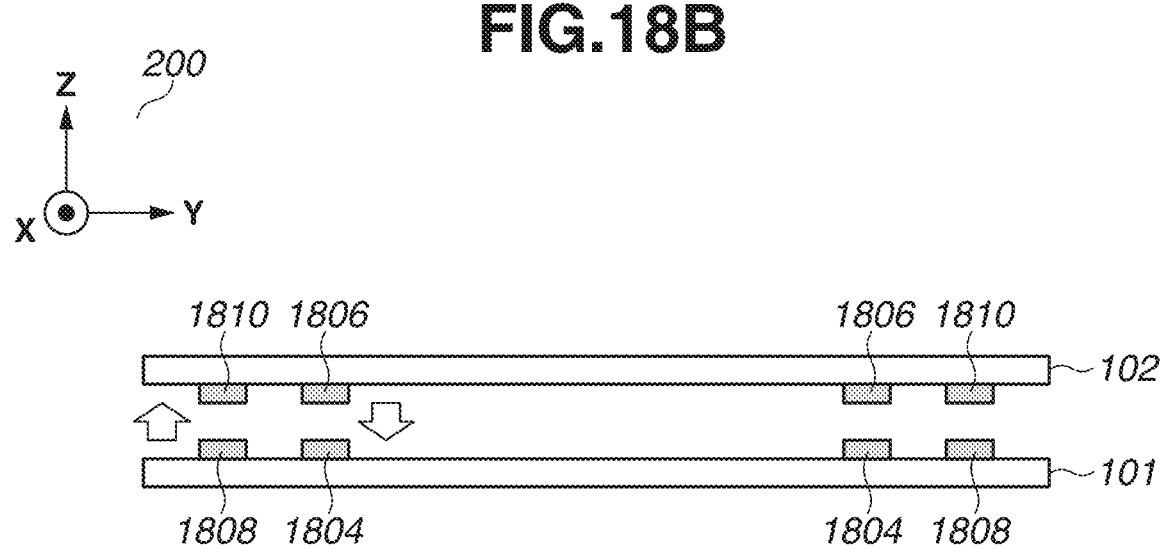

Another configuration example in which the couplers are rotationally movable will be described with reference to FIGS. 18A and 18B. FIG. 18A is a perspective view of a part of the system 100, and FIG. 18B illustrates the part of the system 100 as viewed from the X-axis positive direction of the coordinate system 200. In the configuration example illustrated in FIGS. 18A and 18B, the communication apparatus 101 includes a disk-like member, and a transmission coupler 1804 and a reception coupler 1808 are disposed substantially concentrically around a point 1900. The communication apparatus 102 also includes a disk-like member, and a transmission coupler 1810 and a reception coupler 1806 are also disposed substantially concentrically around a point 1901. The point 1900 and the point 1901 are points overlapping each other as viewed from the Z-axis positive direction of the coordinate system 200. Communication is carried out between the transmission coupler 1804 and the reception coupler 1806, and communication is carried out between the transmission coupler 1810 and the reception coupler 1808. Employing such a configuration enables the communication to be carried out between the communication apparatus 101 and the communication apparatus 102 while one or more of the disk-like member included in the communication apparatus 101 and the disk-like member included in the communication apparatus 102 is rotationally moved around an axis in the Z-axis direction that passes through the point 1900 and the point 1901.

In the configuration example illustrated in FIGS. 18A and 18B, a ground conductor can be disposed between the transmission coupler 1804 and the reception coupler 1808 and/or the transmission coupler 1810 and the reception coupler 1806 as described with reference to FIGS. 8A and 8B for the purpose of preventing or reducing the interference of the electric signal between the couplers. Alternatively, in the configuration example illustrated in FIGS. 18A and 18B, a shield conductor can be provided to the communication apparatus 101 and/or the communication apparatus 102 as described with reference to FIGS. 13A, 13B, and 13C, and 14A, 14B, and 14C for the purpose of preventing or reducing the interference of the electric signal between the couplers.

In the configuration example illustrated in FIGS. 18A and 18B, the system 100 can be configured such that the transmission coupler and the reception coupler supposed to communicate with each other have different lengths from each other as described with reference to FIGS. 9A, 9B, 9C, and 9D for the purpose of preventing or reducing the interference of the electric signal between the couplers. For example, even with the transmission coupler 1810 shortened and shaped into an arc shape, the reception coupler 1808 with the circular shape enables the communication to be carried out between transmission coupler 1810 and the reception coupler 1808 even when the coupler is rotationally moved around the Z axis. Conversely, the transmission coupler 1810 and the reception coupler 1808 can have a circular shape and an arc shape, respectively. The transmission coupler 1804 and the reception coupler 1806 can have different lengths from each other. In the configuration example illustrated in FIGS. 18A and 18B, the plurality of configurations for preventing or reducing the interference of the electric signals between the couplers can be used in combination.

<Effect of Preventing or Reducing Interference Due to Shield Conductor>

Figure 19A:
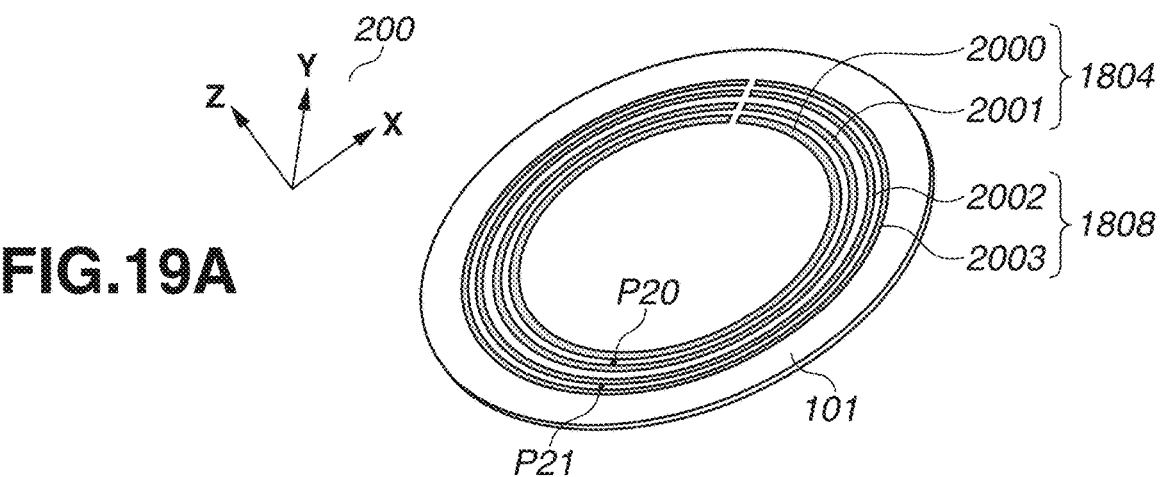
FIGS. 19A, 19B, and 19C illustrate a simulation result regarding the interference of the electric signals in the wireless communication system 100 including the rotationally movable couplers.
Figure 19B:
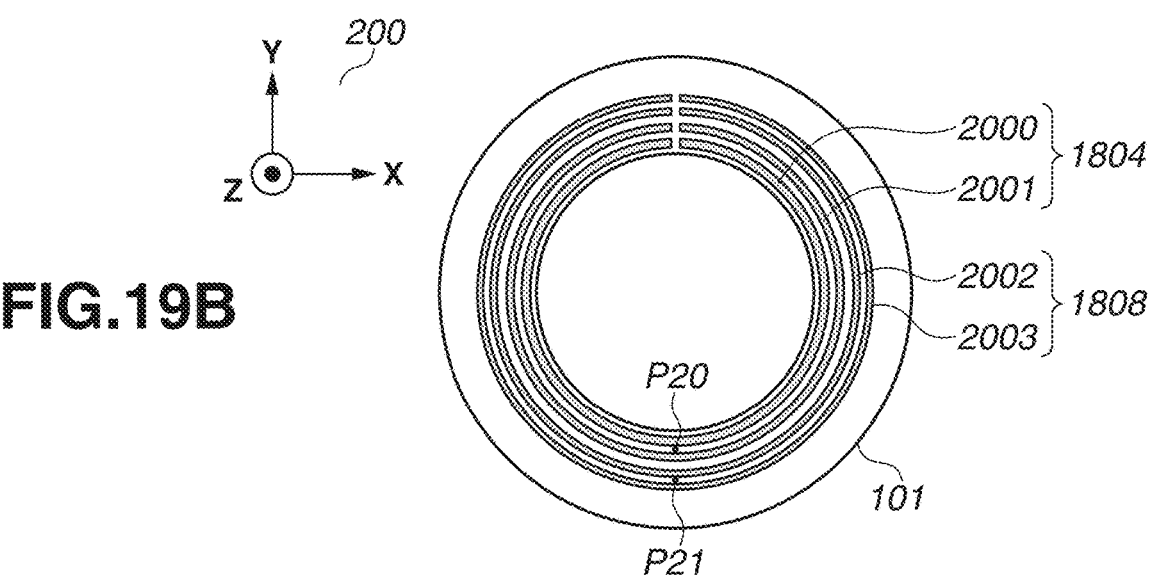

An effect of preventing or reducing the interference by the shield conductor described with reference to FIGS. 13A, 13B, and 13C, and 14A, 14B, and 14C will be described with reference to FIGS. 19A, 19B, and 19C to FIGS. 21A, 21B, and 21C. FIGS. 19A, 19B, and 19C to FIGS. 21A, 21B, and 21C illustrate models and results of a simulation in the case where the rotationally movable coupler structure described with reference to FIGS. 18A and 18B is used. FIGS. 19A, 20A, and 21A are perspective views of models regarding the coupler portion of the communication apparatus 101, and FIGS. 19B, 20B, and 21B illustrate models when the coupler portion of the communication apparatus 101 is viewed from the Z-axis positive direction. These models are constructed assuming that the coupler is the coupler for electric field coupling that carries out the wireless communication by the differential transmission, and a conductor 2000 and a conductor 2001 form the transmission coupler 1804 and a conductor 2002 and a conductor 2003 form the reception coupler 1808. The transmission coupler 1804 includes a power supply point P20 and the reception coupler 1808 includes a power supply point P21.

In each of the models of the simulation illustrated in FIGS. 19A, 19B, and 19C to 21A, 21B, and 21C, the transmission coupler 1804 and the reception coupler 1808 are formed as patterns on one surface (front surface) of a circular substrate included in the communication apparatus 101. In the model of the simulation illustrated in FIGS. 20A, 20B, and 20C, a shield conductor 2100 is formed as a pattern on the other surface (back surface) of the circular substrate. In the model of the simulation illustrated in FIGS. 21A, 21B, and 21C, a shield conductor 2200 including a slit is formed as a pattern on the other surface (back surface) of the circular substrate. The coupler portion of the communication apparatus 102 disposed to face the coupler portion of the communication apparatus 101 is also configured in a similar manner.

In the present simulation, the circular substrate has an outer shape of 95 mm and an inner diameter of 56 mm. An outermost diameter of the coupler (diameter of the conductor 2003) is 79 mm, and an innermost diameter of the coupler (diameter of the conductor 2000) is 59 mm. Widths of the conductor 2000 and the conductor 2001 are each 1.5 mm, and widths of the conductor 2002 and the conductor 2003 are each 1.0 mm. An interval between the conductor 2000 and the conductor 2001 and an interval between the conductor 2002 and the conductor 2003 are each 1.5 mm, and an interval between the conductor 2001 and the conductor 2002 is 2.0 mm. An outermost diameter and an innermost diameter of each of the shield conductor 2100 and the shield conductor 2200 are 80 mm and 57 mm, respectively. A width and a diameter of the slit of the shield conductor 2200 are 0.5 mm and 69 mm, respectively. An interval between the circular substrate included in the communication apparatus 101 and the circular substrate included in the communication apparatus 102 is 0.5 mm.

Figure 19C:
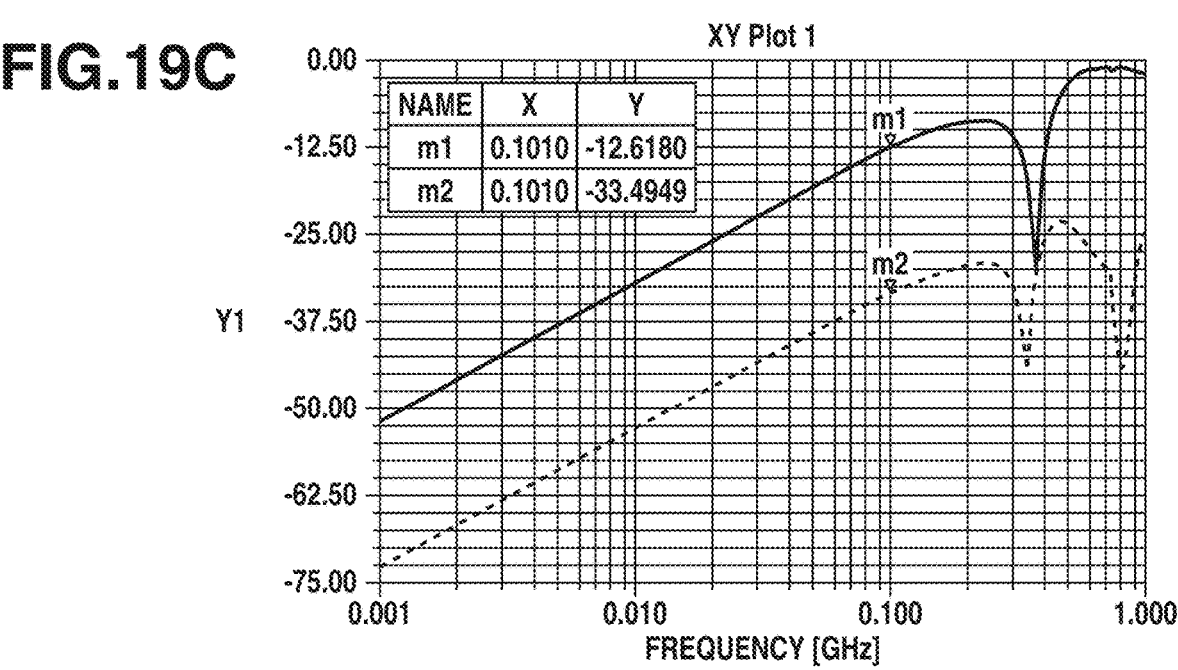
Figure 20A:
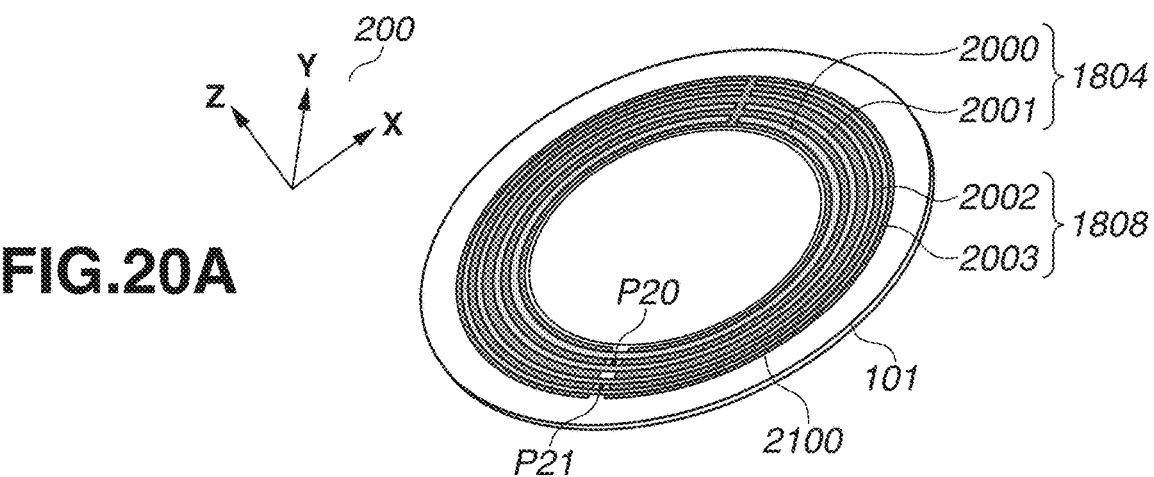
FIGS. 20A, 20B, and 20C illustrate a simulation result regarding the interference of the electric signals in the wireless communication system 100 including the rotationally movable couplers in a case where the shield conductor is used.
Figure 20B:
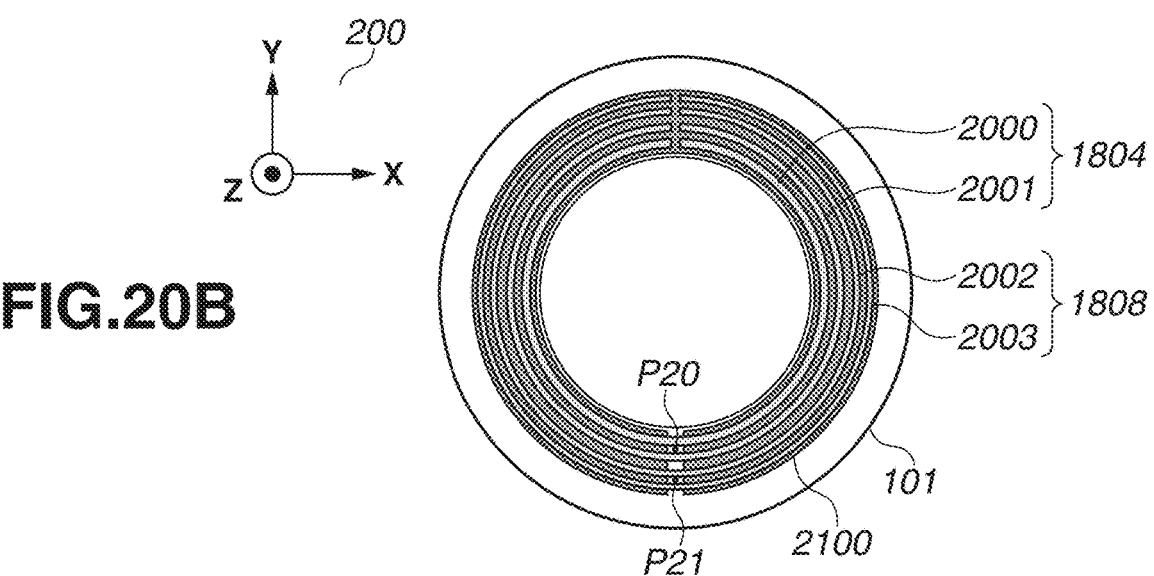
Figure 20C:
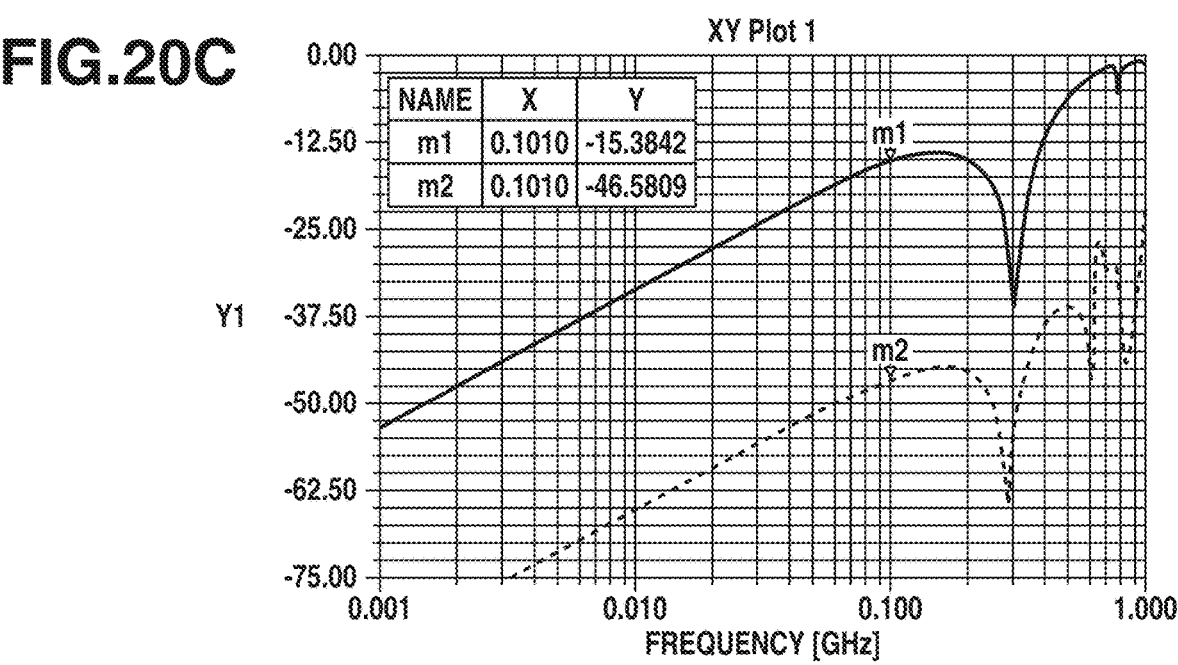
Figure 21A:
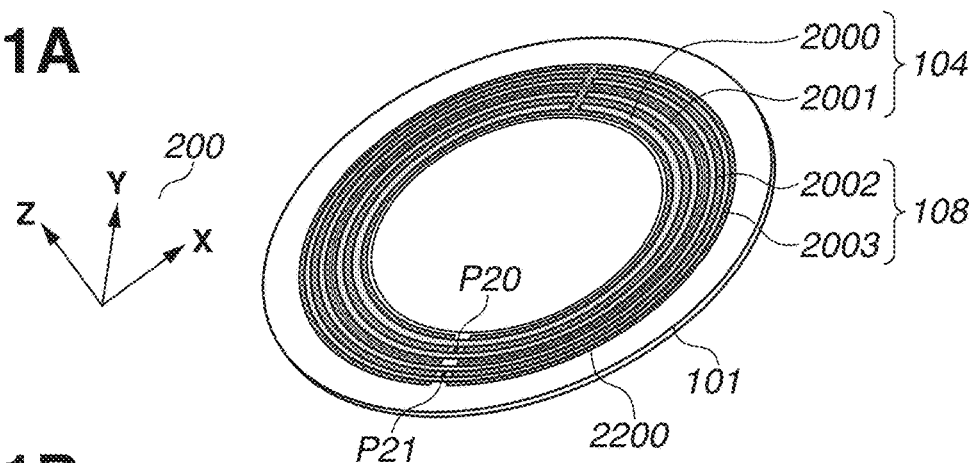
FIGS. 21A, 21B, and 21C illustrate a simulation result regarding the interference of the electric signals in the wireless communication system 100 including the rotationally movable couplers in a case where the shield conductor having the slit is used.
Figure 21B:
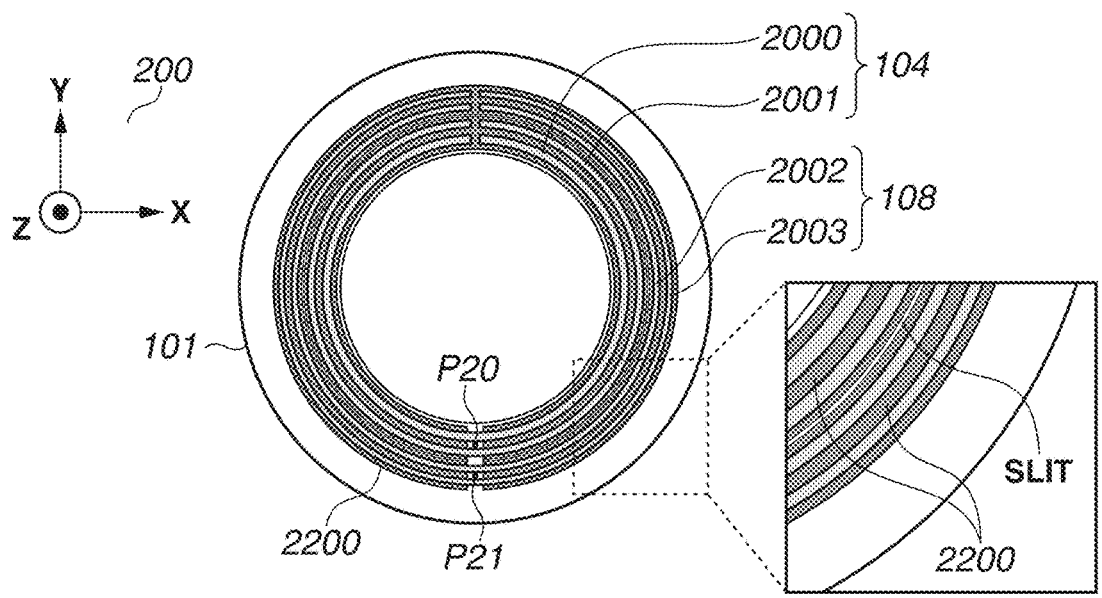
Figure 21C:
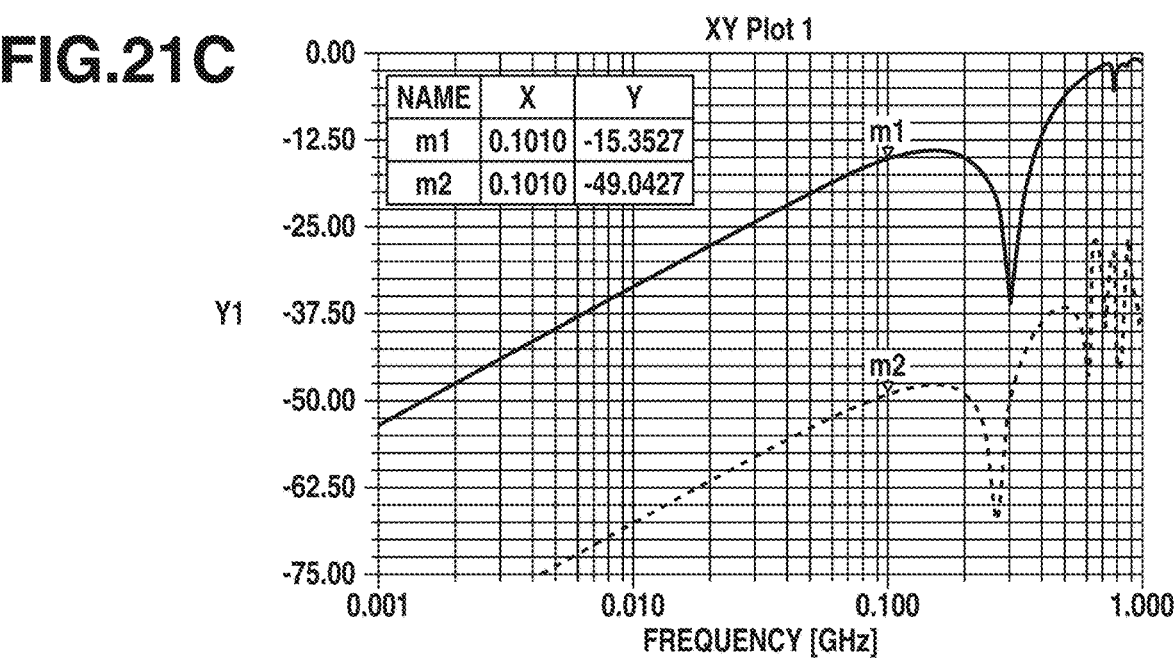

FIGS. 19C, 20C, and 21C are graphs each indicating a simulation result regarding a characteristic of the transmission between the couplers facing each other in a case where the coupler portion of the communication apparatus 101 and the coupler portion of the communication apparatus 102 are arranged to face each other in proximity to each other. A vertical axis and a horizontal axis of the graph indicate a gain and a frequency of the transmitted electric signal, respectively. A solid line and a dotted line in the graph indicate a characteristic of the transmission between the transmission coupler 1804 and the reception coupler 1806, and a characteristic of the transmission between the transmission coupler 1804 and the reception coupler 1808, respectively. This graph means that a degree of preventing or reducing the interference of the electric signal between the couplers is large if the gain of the characteristic of the transmission between the couplers adjacent to each other that is indicated by the dotted line is small compared to the gain of the characteristic of the transmission between the couplers facing each other that is indicated by the solid line (if a difference between the gains is large).

FIGS. 19A, 19B, and 19C illustrate the model and the result of the simulation in the case where no shield conductor is disposed. When the frequency of the electric signal is 100 MHz, the characteristic of the transmission between the couplers facing each other (solid line) is −12.6 dB while the characteristic of the transmission between the couplers adjacent to each other (dotted line) is −33.4 dB, so that a difference of 20.8 dB is generated therebetween.

FIGS. 20A, 20B, and 20C illustrate the model and the result of the simulation in the case where the shield conductor 2100 is disposed to overlap the couplers. When the frequency of the electric signal is 100 MHz, the characteristic of the transmission between the couplers facing each other is −15.3 dB while the characteristic of the transmission between the couplers adjacent to each other is −46.5 dB, so that a difference of 31.2 dB is generated therebetween. In other words, this simulation indicates such a result that an effect of reducing the interference by 10.4 dB can be acquired compared to the configuration in the case where no shield conductor is used (in the case of FIGS. 19A, 19B, and 19C).

FIGS. 21A, 21B, and 21C illustrate the model and the result of the simulation in the case where the shield conductor 2200 including the slit is disposed to overlap the couplers. When the frequency of the electric signal is 100 MHz, the characteristic of the transmission between the couplers facing each other is −15.3 dB while the characteristic of the transmission between the couplers adjacent to each other is −49.0 dB, so that a difference of 33.7 dB is generated therebetween. In other words, this simulation indicates such a result that an effect of further reducing the interference by 2.5 dB can be acquired compared to the configuration in the case where the shield conductor 2100 with no slit is used (in the case of FIGS. 20A, 20B, and 20C).

As described above, the wireless communication system according to the present exemplary embodiment (system 100, system 400, system 500, and system 600) includes a first antenna and a second antenna. The wireless communication system includes a third antenna that carries out wireless communication based on electromagnetic field coupling with the first antenna, and a fourth antenna that carries out wireless communication based on electromagnetic field coupling with the second antenna. With such a configuration, high-speed communication can be realized in the wireless communication system carrying out the communication based on the electromagnetic field coupling. Disposing each of the antennas using the above-described various methods for preventing or reducing the interference causes an electric signal transmitted from the first antenna and received by the second antenna to have weaker strength than strength of an electric signal transmitted from the first antenna and received by the third antenna. In other words, the wireless communication system can prevent or reduce interference of the electric signal between the first antenna and the second antenna, and interference of the electric signal between the third antenna and the fourth antenna.

In the present exemplary embodiment, the wireless communication system has been described based on the example in which the electric signal is transmitted and received between the transmission coupler and the reception coupler based on the baseband method. Based on the baseband method, the electric signal does not have to be modulated and demodulated, and therefore a circuit scale can be reduced. However, the communication method is not limited thereto, and, for example, carrier communication can be carried out by modulating a carrier wave transmitted from the transmission coupler to the reception coupler based on the electric signal generated by the transmission circuit. In the case where the carrier communication is carried out, the interference of the communication can be prevented or reduced by using different frequencies as a frequency of a carrier wave transmitted between one pair of transmission and reception couplers and a frequency of a carrier wave transmitted between another pair of transmission and reception couplers.

According to the above-described exemplary embodiment, high-speed communication can be realized in the wireless communication system.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. A wireless communication system comprising:
   a first communication unit comprising a first antenna and a second antenna;
   a second communication unit comprising a third antenna and a fourth antenna;
   a first communication control unit configured to control wireless data communication based on electromagnetic field coupling between the first antenna and the third antenna;
   a second communication control unit configured to control wireless data communication based on electromagnetic field coupling between the second antenna and the fourth antenna; and
   a movement control unit configured to move at least one of the first communication unit and the second communication unit relatively to the other while maintaining a positional relationship in which the first antenna faces the third antenna and the second antenna faces the fourth antenna.

2. The wireless communication system according to claim 1, wherein
   in the positional relationship, an area of a portion of the first antenna facing the third antenna is larger than an area of a portion of the first antenna facing the second antenna and an area of a portion of the second antenna facing the fourth antenna is larger than an area of a portion of the second antenna facing the first antenna.

3. The wireless communication system according to claim 1, wherein
   the first communication control unit is configured to control wireless transmission of a signal from the first antenna to the third antenna, and
   the second communication control unit is configured to control wireless transmission of a signal from the second antenna to the fourth antenna.

4. The wireless communication system according to claim 3, wherein
   a phase of a signal inputted into the first antenna is substantially opposite to a phase of a signal inputted into the second antenna.

5. The wireless communication system according to claim 3, wherein
   the movement control unit is configured to move at least one of the first communication unit and the second communication unit relatively to the other while maintaining a state in which a strength of a signal transmitted from the first antenna to the fourth antenna is weaker than a strength of a signal transmitted from the first antenna to the third antenna.

6. The wireless communication system according to claim 1, wherein
the first communication control unit is configured to control wireless transmission of a signal from the first antenna to the third antenna, and
the second communication control unit is configured to control wireless transmission of a signal from the fourth antenna to the second antenna.

7. The wireless communication system according to claim 6, wherein
the movement control unit is configured to move at least one of the first communication unit and the second communication unit relatively to the other while maintaining a state in which a strength of a signal transmitted from the first antenna to the second antenna is weaker than a strength of a signal transmitted from the first antenna to the third antenna.

8. The wireless communication system according to claim 1, wherein
the first antenna and the second antenna respectively forms shapes of lines, and
the movement control unit is configured to move the third antenna and the fourth antenna along the lines.

9. The wireless communication system according to claim 1, wherein
the first antenna forms at least a part of a shape of a first ring,
the second antenna forms at least a part of a shape of a second ring, and
the movement control unit is configured to move the third antenna along the first ring and move the fourth antenna along the second ring.

10. The wireless communication system according to claim 1, wherein
the first antenna and the second antenna respectively form shapes of rings centered at a position on an axis,
the third antenna and the fourth antenna respectively form shapes of rings centered at a position on the axis, and
the movement control unit is configured to rotate the third antenna and the fourth antenna around the axis.

11. The wireless communication system according to claim 10, wherein
the first antenna faces the third antenna in a direction of the axis, and
the second antenna faces the fourth antenna in the direction of the axis.

12. The wireless communication system according to claim 10, wherein
the first antenna faces the third antenna in a radial direction of the rings, and
the second antenna faces the fourth antenna in the radial direction of the rings.

13. The wireless communication system according to claim 1, wherein
the first antenna is positioned on a surface of a plate-like member,
the second antenna is positioned on an opposite surface of the plate-like member from the surface on which first antenna is positioned,
the third antenna is positioned on a same side from the plate-like member as the first antenna, and
the fourth antenna is positioned on a same side from the plate-like member as the second antenna.

14. The wireless communication system according to claim 1, wherein
lengths of the first antenna and the second antenna in a direction of movement by the movement control unit are longer than lengths of the third antenna and the fourth antenna in the direction.

15. The wireless communication system according to claim 1, wherein
the first antenna and the second antenna are positioned on a single substrate, and
the third antenna and the fourth antenna are positioned on another single substrate.

16. The wireless communication system according to claim 1, further comprising
a conductor configured to serve as an electric ground positioned between the first antenna and the second antenna.

17. The wireless communication system according to claim 1, further comprising
a conductor configured to serve as an electromagnetic shield overlapping the first antenna and the second antenna as viewed from a facing direction of antennas, wherein the conductor includes a slit at a position between the first antenna and the second antenna as viewed from the facing direction.

18. The wireless communication system according to claim 1, further comprising
a support unit configured to support the first communication unit and the second communication unit such that the movement control unit is able to move the at least one of the first communication unit and the second communication unit relatively to the other while maintaining the positional relationship.

19. The wireless communication system according to claim 1, wherein
the first communication unit is comprised in a pan head portion of a camera, and
the second communication unit is comprised in an imaging portion of the camera.

20. The wireless communication system according to claim 1, wherein
the first communication unit is comprised in a hand portion of a robot arm, and
the second communication unit is comprised in an arm portion coupled with the hand portion of the robot arm.

21. The wireless communication system according to claim 1, wherein
the first communication unit is comprised in a print head of a printer, and
the second communication unit is comprised in a body of the printer.

22. A wireless communication system comprising:
a first communication unit comprising a first antenna and a second antenna;
a second communication unit comprising a third antenna and a fourth antenna;
a first communication control unit configured to control wireless transmission of a signal from the first antenna to the third antenna based on electromagnetic field coupling;
a second communication control unit configured to control wireless transmission of a signal from the second antenna to the fourth antenna based on electromagnetic field coupling; and
a movement control unit configured to move at least one of the first communication unit and the second communication unit relatively to the other while maintaining a state in which a strength of a signal transmitted from the first antenna to the fourth antenna is weaker than a strength of a signal transmitted from the first antenna to the third antenna.

23. A method for wireless communication by a first communication unit comprising a first antenna and a second antenna, and a second communication unit comprising a third antenna and a fourth antenna, the method comprising:
- controlling wireless data communication based on electromagnetic field coupling between the first antenna and the third antenna;
- controlling wireless data communication based on electromagnetic field coupling between the second antenna and the fourth antenna; and
- moving at least one of the first communication unit and the second communication unit relatively to the other while maintaining a positional relationship in which the first antenna faces the third antenna and the second antenna faces the fourth antenna.

24. The method according to claim 23, wherein
in the positional relationship, an area of a portion of the first antenna facing the third antenna is larger than an area of a portion of the first antenna facing the second antenna and an area of a portion of the second antenna facing the fourth antenna is larger than an area of a portion of the second antenna facing the first antenna.

25. The method according to claim 23, wherein
the moving includes moving at least one of the first communication unit and the second communication unit relatively to the other while maintaining a state in which a strength of a signal transmitted from the first antenna to the second antenna is weaker than a strength of a signal transmitted from the first antenna to the third antenna.

* * * * *